US008994293B2

(12) United States Patent
Beasley et al.

(10) Patent No.: US 8,994,293 B2
(45) Date of Patent: Mar. 31, 2015

(54) SINGLE PHASE BRIDGELESS BOOST CONVERTER FOR LED LIGHTING APPLICATIONS

(71) Applicant: Robertson Transformer Co., Blue Island, IL (US)

(72) Inventors: Denny D. Beasley, La Grange Park, IL (US); Peter W. Shackle, Blue Island, IL (US)

(73) Assignee: Robertson Transformer Co., Blue Island, IL (US)

( * ) Notice: Subject to any disclaimer, the term of this patent is extended or adjusted under 35 U.S.C. 154(b) by 0 days.

(21) Appl. No.: 14/080,654

(22) Filed: Nov. 14, 2013

(65) Prior Publication Data
US 2014/0139142 A1 May 22, 2014

Related U.S. Application Data

(60) Provisional application No. 61/726,324, filed on Nov. 14, 2012, provisional application No. 61/904,285, filed on Nov. 14, 2013.

(51) Int. Cl.
*H05B 33/08* (2006.01)
*H02M 5/293* (2006.01)

(52) U.S. Cl.
CPC ........... *H02M 5/293* (2013.01); *H05B 33/0815* (2013.01)
USPC ............................. 315/307; 315/258; 315/224

(58) Field of Classification Search
USPC .......... 315/224, 246, 258, 291, 294, 297, 307
See application file for complete search history.

(56) References Cited

U.S. PATENT DOCUMENTS

| 4,198,675 | A | 4/1980 | Moore |
| 5,493,134 | A | 2/1996 | Mehrotra et al. |
| 5,621,627 | A * | 4/1997 | Krawchuk et al. .............. 363/37 |
| 7,015,654 | B1 * | 3/2006 | Kuhlmann et al. ........... 315/291 |
| 7,940,539 | B2 | 5/2011 | Esmaili et al. |
| 2004/0095103 | A1 * | 5/2004 | Kernahan ...................... 323/272 |
| 2010/0259240 | A1 | 10/2010 | Cuk |
| 2011/0043115 | A1 | 2/2011 | Ge et al. |
| 2011/0089852 | A1 | 4/2011 | Segan |
| 2011/0291585 | A1 | 12/2011 | Foo |

(Continued)

OTHER PUBLICATIONS

Smith, et al., "A New PWM Controller with One Cycle Response," IEEE Transactions on Power Electronics, vol. 14, Issue 1, Jan. 1999, pp. 970-976.

(Continued)

*Primary Examiner* — Don Le
(74) *Attorney, Agent, or Firm* — Conley Rose, P.C.; Grant Rodolph

(57) ABSTRACT

A circuit serving as a power source for light-emitting diode (LED) lighting applications, the circuit comprising a boost converter comprising a pair of boost field-effect transistors (FETs) and a boost inductor coupled to the pair of boost FETs, wherein an input voltage feeding the boost converter has a sinusoidal waveform, and wherein a half cycle of the input voltage is represented by a plurality of time slices, and a controller coupled to the boost converter and configured to determine a current time slice in the plurality of time slices, generate one or more output signals based at least in part on the current time slice and without a need to compute any multiplier function involving the input voltage, and control states of the boost FETs using the one or more output signals.

20 Claims, 16 Drawing Sheets

(56) References Cited

U.S. PATENT DOCUMENTS

| | | |
|---|---|---|
| 2012/0043900 A1 | 2/2012 | Chitta et al. |
| 2012/0056645 A1 | 3/2012 | Beasley |
| 2012/0081009 A1* | 4/2012 | Shteynberg et al. .......... 315/122 |

OTHER PUBLICATIONS

Lu, et al., "Bridgeless PFC Implementation Using One Cycle Control Technique," Applied Power Electronics Conference and Exposition, 2005, APEC 2005, vol. 2. Digital Object Identifier: 10.1109/APEC. 2005.1453073. Publication Year: 2005 pp. 812-187.

Martinez, "A High-Performance Single-Phase Rectifier with Input Power Factor Correction," IEEE Transactions on Power Electronics, vol. 11, No. 2, Mar. 1996, pp. 311-317.

Foreign Communication From a Counterpart Application, PCT Application No. PCT/US/070183, International Search Report dated May 15, 2014, 5 pages.

Foreign Communication From a Counterpart Application, PCT Application No. PCT/US/070183, Written Opinion dated May 15, 2014, 9 pages.

Roig, J., et al., "Body-Diode Related Losses in Shield-Plate FETs for SiP 12V-input DC/DC Buck Converters Operating at High-Frequency (4MHz)," Proceedings of the 2012 24th International Symposium on Power Semiconductor Devices ICs, Bruges, Belgium, XP032197912, Jun. 3-7, 2012, pp. 291-294.

Case, M., J., et al., "An Efficient Gate Driver for High-Power Insulated Gate Bipolar Transistors," Conference Record of the 1994 IEEE, Industry Applications Society Annual Meeting, XP010124237, Oct. 2, 1994, pp. 1303-1309.

Lopez, T., et al., "Design and Roadmap Methodology for Integrated Power Modules in High Switching Frequency Synchronous Buck Voltage Regulators," Applied Power Electronics Conference and Exposition, APEC, XP0314426559, Feb. 15, 2009, pp. 90-96.

* cited by examiner

SINGLE PHASE BRIDGELESS BOOST CONVERTER FOR LED LIGHTING APPLICATIONS

CROSS-REFERENCE TO RELATED APPLICATIONS

The present application claims priority to U.S. Provisional Patent Application No. 61/726,324 filed Nov. 14, 2012 by Denny D. Beasley et al. and entitled "A Single Phase Bridgeless Boost Converter for LED Lighting Applications", and U.S. Provisional Patent Application No. 61/904,285 filed Nov. 14, 2013 by Denny D. Beasley et al. and entitled "A Single Phase Bridgeless Boost Converter for LED Lighting Applications", both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A boost converter is a step-up power converter that may generate an output voltage greater than its input voltage. It is a class of switched-mode power supply (SMPS) that contains semiconductor switches (e.g., diodes and transistors) and one or more energy storage elements (e.g., a capacitor, an inductor, or combinations thereof). Filters made of capacitors may be added to the output of the boost converter to reduce output voltage ripple.

A bridgeless boost converter may lack a full-rectifier bridge in either of the two conduction paths. Instead, a bridgeless boost converter may be implemented by replacing a pair of bridge rectifiers with switches and employing an alternating current (AC) side boost inductor. Thus, the bridgeless boost converter may avoid power loss caused by the bridge rectifier, thereby improving power efficiency.

An early description of a single phase bridgeless boost converter is included in a publication by Martinez et al. entitled "A High-Performance Single Phase Rectifier with Input Power Factor Correction," which calls the bridgeless boost converter a rectifier with power factor correction (PFC). This publication lays out the advantages of a single phase bridgeless boost converter, including increased efficiency resulting from eliminating two diode drops with their associated power loss from the path of an incoming line current.

Another publication by Lu et al. entitled "Bridgeless PFC Implementation Using one Cycle Control Technique" describes a single phase bridgeless boost converter applied using a then new principle of one cycle control. This publication calls the bridgeless boost converter a bridgeless power factor correction circuit. A pulse width modulation (PWM) controller with one cycle response is discussed therein. This publication discloses ways of sensing an inductor current and voltage, in order to provide inputs to a control processor. An efficiency of 96% was demonstrated, but only at low power levels (e.g., less than 250 watts). This publication also discusses electromagnetic interference (EMI) issues specific to the architecture used therein.

Further, U.S. Pat. No. 7,940,539 by Esmaili et al. describes a bridgeless boost converter, which is referred to therein as a single phase full bridge boost converter, that is suitable for the purpose of regenerative braking in electric cars.

The publications above describe manifestations of similar circuit topologies. However, none of the publications above describes how to make a single phase bridgeless boost converter truly efficient at high power levels (e.g., over 1,000 watts). As light-emitting diodes (LED) lighting applications may sometimes need to operate under high power level, it is desirable to improve power efficiency for such applications.

SUMMARY

In one embodiment, the disclosure includes a circuit serving as a power source for light-emitting diode (LED) lighting applications, the circuit comprising a boost converter comprising a pair of boost field-effect transistors (FETs) and a boost inductor coupled to the pair of boost FETs, wherein an input voltage feeding the boost converter has a sinusoidal waveform, and wherein a half cycle of the input voltage is represented by a plurality of time slices, and a controller coupled to the boost converter and configured to determine a current time slice in the plurality of time slices, generate one or more output signals based at least in part on the current time slice and without a need to compute any multiplier function involving the input voltage, and control states of the boost FETs using the one or more output signals.

In another embodiment, the disclosure includes a power source circuit comprising a boost converter comprising a pair of boost FETs and a boost inductor coupled to the pair of boost FETs, and a controller coupled to the boost converter and configured to control states of the boost FETs such that one of the boost FETs operates in a third quadrant while the other one of the boost FETs is forward biased, wherein a voltage between the drain and the source of the boost FET operating in the third quadrant is less than a turn-on threshold voltage of a parasitic body diode in the boost FET.

In yet another embodiment, the disclosure includes a method, implemented in a power source that comprises a boost converter and a controller coupled to the boost converter, comprising feeding the boost converter with an input voltage with a sinusoidal waveform, wherein a half cycle of the input voltage is represented by a plurality of time slices, determining, by using the controller, a current time slice in the plurality of time slices, and generating, by using the controller, one or more signals to control the boost converter, wherein generating the one or more signals is based in part on the current time slice and involves no computation of any multiplier function operating on the input voltage.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to embodiments disclosed herein, a power source circuit comprising a single phase bridgeless boost converter and its supporting components including a controller can be optimized for light-emitting diode (LED) lighting applications. For example, an assumption can be made that an input power line voltage has a sinusoidal waveform, thus a need to sample the input voltage for the purpose of power factor correction may be eliminated. Power efficiency may be improved by embodiments disclosed herein to meet high efficiency needs of LED drive applications. Features of the disclosed boost converter circuit include implementation of a continuous conduction operation mode, and a third quadrant operation that uses the main field-effect transistors (FETs) switches to conduct in both the forward and reverse directions. Boost diodes may be replaced by FET switches to further improve efficiency. Moreover, a deterministic microprocessor control is disclosed to achieve fast control response with minimal computing resources (e.g., without computing any multiplier function).

Figure 1:
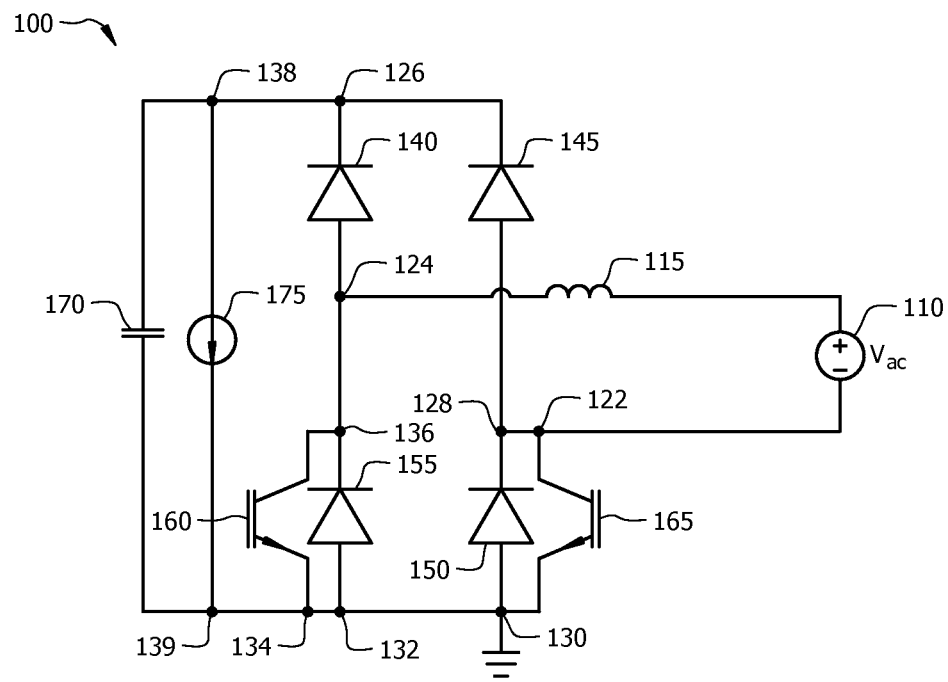
FIG. 1 is a schematic diagram of a conventional bridgeless boost converter circuit.

FIG. 1 is a schematic diagram of a bridgeless boost converter circuit 100. The circuit 100 comprises an AC voltage source (denoted as $V_{ac}$) 110, an inductor 115, a pair of boost FETs 160 and 165, a pair of stand-alone boost diodes 140 and 145, a capacitor 170, and a load 175 arranged as shown in FIG. 1. Components of the circuit 100 are coupled through nodes including 124, 126, 130, 132, 134, 138, and 139. Each of the FETs 160 and 165 may have an intrinsic or parasitic body diode, denoted as diodes 155 and 150, respectively.

Compared with boost converter with front end bridge rectifiers, the principal advantage of the circuit 100 comes from the elimination of power losses associated with the front end bridge rectifier. In operation, when the drain of the FET 165 has a positive voltage, the FET 165 is turned on and starts to charge the inductor 115 with current. When the current in the inductor 115 becomes sufficient to produce a desired input waveform, or reach a maximum current level allowed by the inductor 115, the FET 165 is turned off. After turning off the FET 165, the current in the inductor 115 may continue through the diode 145 and charge the capacitor 170. On the other hand, the FET 160 may conduct in the reverse direction through its intrinsic body diode 155. When the power line polarity is reversed, the roles of the FET 165 and the FET 160 are reversed. Note that, although only one inductor 115 is shown in FIG. 1 to explain the principle, for reasons associated with EMI, sometimes two inductors can be used, with each on one side of the power line input. It is possible for the two separate windings to share a common core, as the objective is to present a balanced impedance on both sides of the power line to reduce EMI.

Some conventional boost converters may operate in a so-called discontinuous conduction mode. In this mode, a boost inductor current may have a triangular waveform and may drop to zero between high frequency operating pulses. This may lead to power losses in the inductor, which are proportional to a root mean square (RMS) value of the current. Consequently, the inductor current may be unnecessarily high, because high peaks of the triangular current pulses contribute disproportionately to the RMS value of the current.

On the contrary, a superior strategy, referred to herein as a continuous conduction mode, may be used in an embodiment disclosed herein. Specifically, once an output voltage dips below what is designed or required (i.e., its target value), the switch 165 is turned on, even though the previous current pulse may still be conducting through the diode 145 and the inductor 115. As before, when sufficient current has been charged into the inductor 115, the switch 165 is turned off and the capacitor 170 is recharged. As a result, the RMS of a current passing through the inductor 115 can be reduced because the high peaks are avoided. Thus, the efficiency of the converter is improved, which suits LED drive applications. The continuous mode operation is known in half-bridge boost circuits, but has not been previously described in bridgeless boost circuits. Another advantage of continuous mode operation is that it may avoid potential ringing effects when the inductor current goes to zero, which have associated losses. The feature of continuous mode conduction may meet the high efficiency requirements of LED drive applications.

According to embodiments disclosed herein, power efficiency may be improved by using the continuous mode conduction in which a current through the boost inductor is not interrupted during each power line half cycle even though the boost FETs switch on and off. In doing so, the full bridge diode is eliminated from the circuit, and the efficiency is thereby improved by turning on each FET during the time that a reverse current is passing through it, thus eliminating the voltage drop associated with the intrinsic diode inside the FET which conducts during reverse current operation.

One disadvantage of conventional boost converter circuits is that the intrinsic diode 155 of FET 160 is conducting during a period that the switch 165 is turned on, which may induce a power loss associated with the inductor current passing through the forward voltage of the diode 155. There is an improvement in efficiency to be had if the FET 160 is actually turned on whenever the FET 165 is turned on. The FET 160 may then conduct backwards. Normal n-channel FETs can conduct bi-directionally, as long as a voltage between the source and drain does not exceed a turn-on threshold of the intrinsic diode (e.g., 0.7 volt (V)). If the voltage exceeds 0.7 V, the intrinsic diode turns on and the advantage of bidirectional operation is lost. For reasons associated with the representation of the power line voltage in terms of its phase angle, this kind of operation is referred to herein as "third quadrant operation". Since the efficiency of the converter is enhanced by eliminating the losses of the intrinsic diode in this way, then this mode of operation is ideal for high efficiency LED drive applications.

Figure 2:
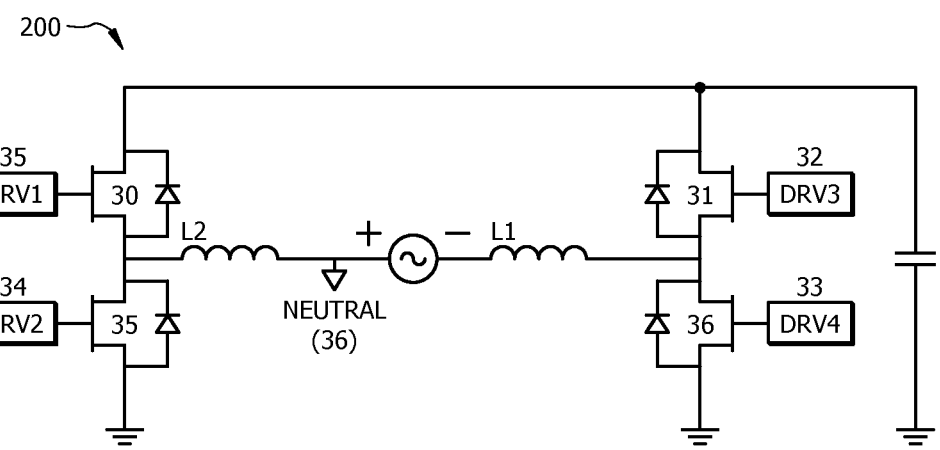
FIG. 2 is a schematic diagram of an embodiment of a boost converter that uses full bridge switching.

Another source of efficiency loss in some boost converters is associated with an inductor current passing through the voltage drop of the boost diodes 140 and 145. FIG. 2 is a schematic diagram of an embodiment of a boost converter 200, which uses full bridge switching to minimize this efficiency loss. As shown in FIG. 2, the boost converter 200 comprises four FETs 30, 31, 35, and 36, but may contain any boost diodes. By replacing boost diodes (e.g., diodes 140 and 145) with FET switches 30 and 31, power loss caused by the voltage drop across the boost diodes may be avoided. By incorporating full bridge switching, the power efficiency may be further enhanced, which may sometimes be a desired feature for the application of LED drives.

In operation, the FET switches 30 and 31 may be turned on whenever the diodes would have been required to conduct, thus operation principles remain the same. Each of the FETs 30, 31, 35, and 36 may comprise a parasitic body diode, which is different from a stand-alone boost diode. The gates of FETs 30, 31, 35, and 36 may be driven by driving signals 35, 32, 34, and 35, respectively.

LED drive applications are very cost sensitive, and for this reason it is desirable to utilize only a minimal microprocessor to control the converter. In order to perform the necessary computations two innovations in control are used: First the technique used in a publication WO 2010/104934A1 by Denny Beasley (incorporated herein by reference) is used, known as deterministic converter control. In this technique, successive measurements of the output voltage are treated statistically, and when one measurement value has happened many more times than adjacent measurement values, then that value is adopted. This is faster and uses fewer machine cycles than computing the mean value of many measurements. Secondly, in the control of the input boost stage, the assumption is made that the incoming voltage waveform is sinusoidal. After ascertaining the line frequency, the entire power line half cycle is divided into 40 time slices (TSes), and then the relative ON time to be allocated to each time slice is taken from a lookup table and adjusted proportionately to produce the desired output voltage. This method is called time slice power factor control. This process is simpler than the conventional multiplier function used for power factor and requires fewer computing cycles to implement.

Figure 3:
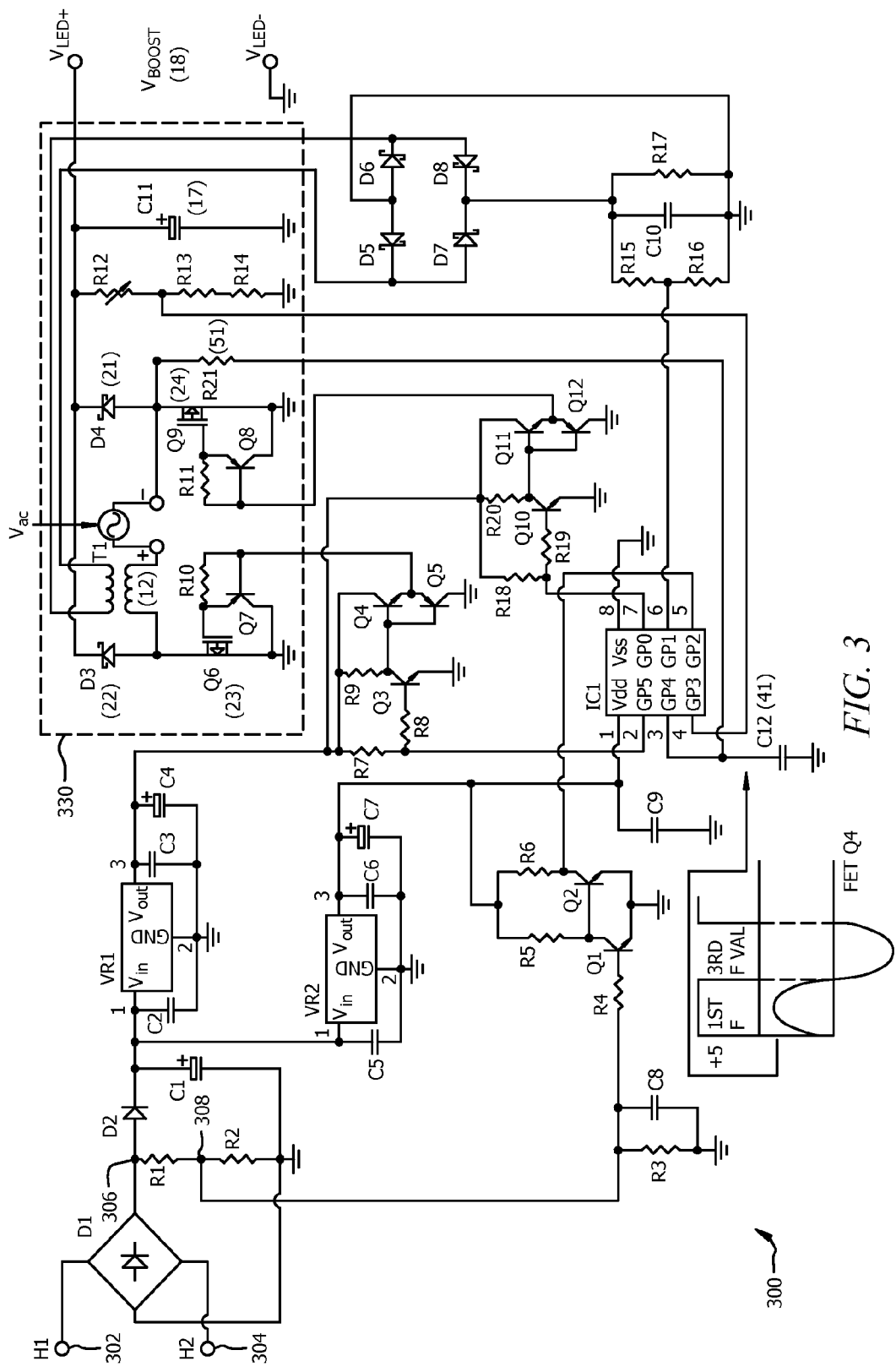
FIG. 3 is a schematic diagram of an embodiment of a power source circuit.

FIG. 3 is a schematic diagram of an embodiment of a power source circuit 300 (sometimes referred to herein as a boost converter circuit), in which disclosed methods may operate. The circuit 300 comprises a bridgeless boost converter and relevant supporting components. As shown in FIG. 3, an AC source voltage is applied between node 302 (denoted as H1) and node 304 (denoted as H2). The source voltage may be a fraction of the power line voltage (denoted as $V_{ac}$ in series with the boost inductor 12). For example, a step-down transformer may be used to convert $V_{ac}$ to the low source voltage, maintaining voltage phase while lowering amplitude.

The AC source voltage may be rectified by a bridge D1 to become a DC voltage. Then, the output voltage of the bridge D1 may be applied on two resistors R1 and R2 at node 306, which may generate a scaled version of the rectified DC voltage at node 308. The resistors R1 and R2 are coupled to a transistor Q1 (e.g., a bipolar junction transistor (BJT)) such that the scaled source voltage may be applied to the base of Q1. As Q1 may switch on or off depending on its base voltage, the zero-cross point of the line voltage $V_{ac}$ can be identified or detected. The circuit section that detects the zero-cross point is coupled to a controller (denoted as IC1). Note that, depending on whether there is intermediate component, the term "coupled to" herein may be direct or indirect.

Over most of the mains-voltage-cycle, the transistor Q1 is saturated. As the pulsating DC voltage from the bridge D1 approaches zero volt, bias current levels in the transistor Q1 may fall below what is needed to keep Q1 in the saturation region. Thus, a voltage at the junction of resistor R5 and transistor Q1 rises to a maximum level, the collector voltage of transistor Q2 drops, which provides a low signal to pin 5 (also denoted as GP2) of a microcontroller denoted as IC1. With suitable programming, the microcontroller or microprocessor IC1 may generate an internal interrupt from this falling edge which identifies a zero crossing of the line voltage $V_{ac}$. Further, frequency of the power line may be determined using this configuration. For example, a time interval between two zero-cross points may be determined to indicate the duration of a half cycle.

The output of the bridge D1 is isolated from a filter capacitor C1 by a diode D2. After the isolation diode D2, the rectified current may be filtered by capacitor C1, after which the rectified current may be delivered to voltage regulators (VR) denoted as VR1 and VR2. The voltage regulators provide low voltage sources for the microprocessor and its support components.

One group of transistors Q3, Q4, and Q5 and another group of transistors Q10, Q11, and Q12 may buffer and level shift PWM outputs generated at pin 2 and pin 7 of IC1. Further, the transistors Q3, Q4, and Q5 supply a gate drive to FET 23, and simultaneously, transistors Q10, Q11, and Q12 supply a gate drive to FET 24. To enable fast switching, resistor R10 and transistor Q7 are coupled between the gate and drain of the FET 23, and resistor R11 and transistor Q8 are coupled between the gate and drain of the PET 24.

Depending on the line polarity, one of a boost PET 23 and a boost FET 24 may be in the first quadrant operation, while the other may be toggling from body diode conduction to the third quadrant conduction. For example, when FET 23 is switched on in a first half cycle, FET 24 may operate in the third quadrant; when FET 24 is switched on in a second half cycle, FET 23 may operate in the third quadrant. When conducting backwards in the third quadrant, the FET 23 or FET 24 may have a source-drain voltage less than a turn-on threshold voltage (e.g., 0.7 V) of its intrinsic or parasitic body diode. Operating in the third quadrant further enhances power efficiency, since power losses caused by the intrinsic diodes of the FETs are avoided.

In an embodiment employing third quadrant operation, the circuit 300 may be arranged to allow each of the FET 23 and the FET 24 to be turned on when conducting in the reverse direction. For this purpose, a high value resistor 51 (also denoted as R21) may be connected to the drain of FET 24. Thus, while the FET 24 is conducting backwards, a negative voltage feeds into pin 4 of the microcontroller IC1, which is coupled to the bridgeless boost converter. While the drain of FET 24 is positive, a positive voltage feeds into pin 4 of IC1. The microcontroller IC1 may have an internal diode clamp that clamps pin 4 to 5 V as a safety mechanism, so high voltage transitions may not be seen by IC1. Further, a small capacitor 41 (also denoted as C12) along with R21 may eliminate any PWM artifacts, and allow IC1 to know which FET is operating in the third quadrant. The microcontroller IC1 may regard FET 24 to be in the third quadrant by default, and regard FET 23 to be in the third quadrant by measurement.

Boost diodes D1 and D4 are coupled in series to the FET 23 and FET 24, respectively, to form part of the boosting loop. In an alternative embodiment that uses full bridge switching (e.g., circuit shown in FIG. 2), the diodes D1 and D4 may be replaced by transistors such as a third FET and a fourth FET. The replacement FETs may be switched on when the diodes would be conducting. Using FETs instead of boost diodes may bring about further efficiency enhancement, as power loss caused by FETs may be smaller than the boost diodes.

In an embodiment, a continuous conduction mode may be used in the circuit 300. Specifically, once an output voltage (denoted as $V_{BOOST}$) of the boost converter 330 (a voltage difference between nodes VLED+ and VLED−) dips below a certain threshold value (may be pre-defined to be any suitable value), the FET 24 is turned on, even though the previous current pulse may still be conducting through the diode 21 and the inductor 12. As before, when sufficient current has been charged into the inductor 12, the FET 24 may be turned off and the capacitor 17 may be recharged. As a result, the RMS of a current passing through the inductor 12 can be reduced compared to a discontinuous conduction mode, because the need for high peaks is eliminated. Power efficiency is also improved, which suits LED drive applications. Another advantage of continuous mode operation is that it may avoid potential ringing effects when current in the inductor 12 goes to zero, which have associated losses. The features of continuous mode conduction may meet the high efficiency requirements of LED drive applications.

One of ordinary skill in the art will understand features taught or enabled by circuits disclosed herein. Thus, in the interest of conciseness, some of the components, such as C2-C7, D5-D8 in FIG. 3, and their roles and features are not elaborated. Depending on the implementation, circuit components disclosed herein may be configured to have any suitable value. Nothing in the above description is meant to limit the present disclosure to any specific materials, geometry or orientation of elements. For example, the boost circuitry described could be replaced by any of other types of converters such as a flyback, buck, buck-boost or forward converter. Many part and orientation substitutions are contemplated within the scope of the present disclosure and will be apparent to one of ordinary skill in the art.

Figure 4A:
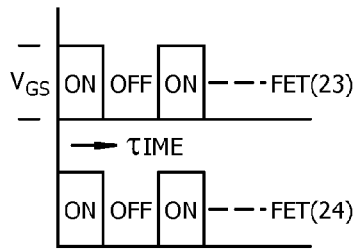
FIGS. 4A-4D are diagrams illustrating exemplary voltage waveforms that can be applied to between the gates and sources of FETs shown in FIG. 3.
Figure 4B:
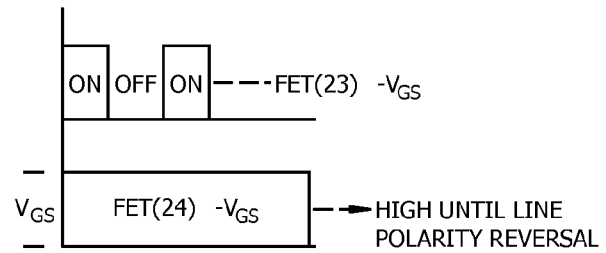
Figure 4C:
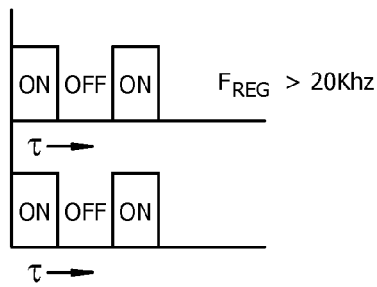
Figure 4D:
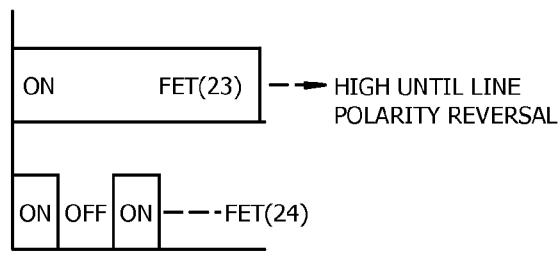

FIGS. 4A-4D are diagrams illustrating exemplary voltage waveforms that can be applied between the gates and sources of FETs shown in FIG. 3. FIGS. 4A and 4C show a first half cycle and a second cycle, respectively, in which the gate-source voltages of the FETs 23 and 24 may both have rising and falling edges. In PWM, the frequency of the control signal may be much higher than that of the power line (e.g., the control frequency may be 20 kilo hertz (KHz). In comparison, FIGS. 4B and 4D show a first half cycle and a second cycle, respectively, in which the gate-source voltage for one of the two FETs has rising and falling edges, while the other one remains at negative high until polarity reversal, which enables the third quadrant operation. For example, FIG. 4B shows that, in the first half cycle, the FET 23 operating in the first quadrant and the FET 24 operating in the third quadrant with a reverse bias voltage. FIG. 4D shows that, in the second half cycle, the FET 24 operating in the first quadrant and the FET 23 operating in the third quadrant with a reverse bias voltage.

Figure 5A:
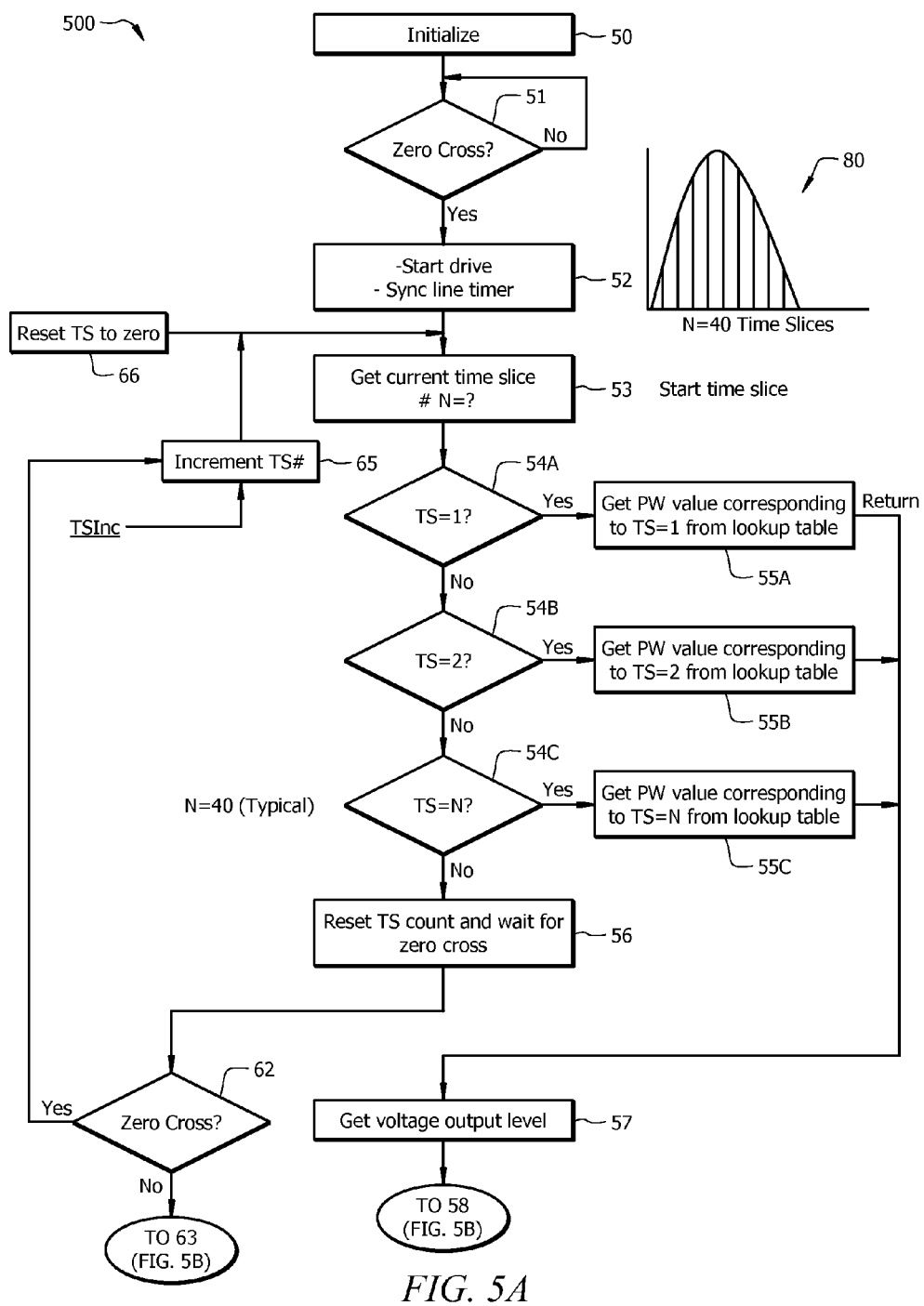
FIGS. 5A and 5B are flowcharts of an embodiment of a method for controlling the power source circuit in FIG. 3.
Figure 5B:
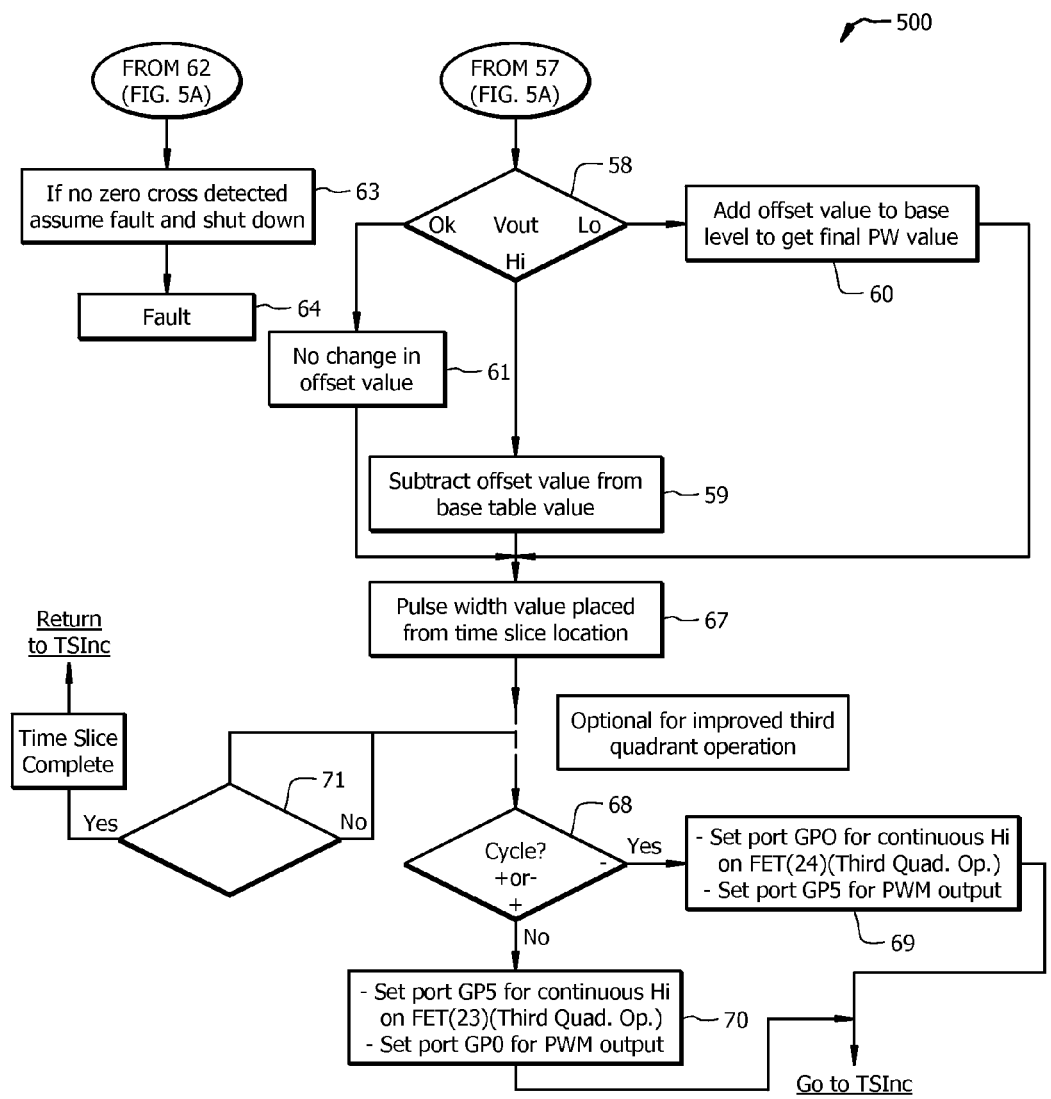

FIGS. 5A and 5B are flowcharts of an embodiment of a method 500 for controlling a power source circuit or boost converter circuit (e.g., the circuit 300). The boost converter circuit may comprise a boost converter, a controller (e.g., a microcontroller or microprocessor) coupled to the boost converter, and a section coupled to the controller.

The method 500 starts with step 50, in which the controller may configure its input and/or output pin configurations. After the initialization step 50, the controller may wait for a falling edge voltage on the zero-cross-detect circuit of Q1 and Q2 shown in FIG. 3. According to block 51, no driving signal (in short as drive) may be applied until the zero crossing has been detected. The purpose of this is to control an inrush as the drive commences at the zero-cross condition allowing for the initial current change rate (denoted as Di/Dt) to be controlled mainly by the slope of the mains voltage rate of rise.

Once the drives are initiated or started as in step 52, a timer is configured to complete 40 time-out-cycles over 8.3 microsecond (mSec) or one half of the line cycle of a 60 hertz (Hz) mains (see step 71 also). The timer may be self-configuring for a line frequency as the timer captures the time of several line zero-cross flags, and configures an internal timer for proper time slice allocation. Note that the number of time slices is arbitrary. Although the number 40 offers suitable control, the number of time slices is not limited to 40 in any way. Various considerations affect determination of this number, such as a drive frequency, and a number of PWM cycles that can occur in any time slice. The frequency may or may not remain fixed, e.g., it may vary as part of an overall control algorithm.

Immediately after drive initiation in step 52, a current or present time slice may be determined in step 53, which may be anywhere from 1 to N (N is an integer indicating a number of total time slices in a half cycle). The current time slice may be used to locate a proper pulse width (PW) value in a look up table. Specifically, in step 54A, the controller may determine whether the current time slice equals one. If the condition in step 54A is met, the method 500 proceeds to step 55A, where a PW value corresponding to TS=1 may be obtained from the lookup table. Otherwise, the method 500 proceeds to step 54B, where the controller may determine whether the current time slice equals two. If the condition in step 54B is met, the method 500 proceeds to step 55B, where a PW value corresponding to TS=2 may be obtained from the lookup table. Otherwise, the method 500 proceeds to a next TS value. Note that, in implementation, TS values may be used iteratively in which TS may increase from one to N, or the current TS may be directly matched to a corresponding PW value in the lookup table without any iteration. If iteration is used, the iteration may stop when the current time slice has been reached or when N has been reached. In step 54C, the controller determines that the current time slice equals N, thus the method 500 proceeds to step 55C, where a PW value corresponding to TS=N is obtained from the lookup table.

In the deterministic approach disclosed herein, instead of using a four-quadrant multiplier to determine a PW value along a time slice, which may involve complex computation, a lookup table may be used directly to locate a PW value corresponding to a time slice. This is possible because an input voltage of the boost converter through a power line for LED lighting applications may often be sinusoidal. An AC half cycle may be divided equally into a plurality of time slices (e.g., 40 time slices). In the sinusoid waveform (e.g., shown as waveform 80 in FIG. 5), the time slice can be determined simply based on time intervals. For example, a time slice increments by one in every 208 mSec or so for a mains voltage frequency of 60 Hz (duration of half cycle divided by N, e.g., (½ Sec)/60/40=208 mSec).

For the purpose of controlling the converter with a microprocessor, a control algorithm, referred to herein as time slice power factor control, may be used to operate the microprocessor using only minimal resources, while avoiding performing the computation-intensive multiplier function (such computation is characteristic of many boost circuits today). For lighting applications, an input voltage through a power line may usually be sinusoidal. Hence it is desirable to save computation resources by making the assumption that the input voltage is sinusoidal. Therefore, the need to even sense the input line voltage is eliminated, which simplifies implementation.

The use of a lookup table may be suited for small 8-bit microcontrollers, because of speed limitations and limited digital signal processing (DSP) capabilities. If more sophisticated controllers are employed in a boost converter circuit, a true numeric control algorithm may be applied at step 54A. After acquiring the time-slice-coordinated PW value, in step 57 the controller may further determine an output voltage of the boost converter, e.g., by measurement result acquired from pin 4 of IC1 in FIG. 3. The controller may use the PW value in conjunction with the output voltage.

In step 58, the output voltage value is used to determine if the PW value needs to increase, decrease or remain unchanged. If the output voltage is higher than designed or required (denoted as Hi in FIG. 5B), the method 500 proceeds to step 59, where an offset value may be subtracted from the PW value to decrease the output voltage. Otherwise, if the output voltage is lower than what is designed or required (denoted as Lo in FIG. 5B), the method 500 proceeds to step 60, where an offset value may be added to the PW value to increase the output voltage; if the output voltage is approximately or substantially equal to what is designed or required (denoted as Ok in FIG. 5B), the method 500 proceeds to block 61, which indicates that the PW value remains unchanged.

In step 67, the corrected PW value, for a corresponding current time slice, may be placed in a drive generator inside the controller to generate a PWM signal. According to block 71, the controller may wait for the TS timer to complete its synchronization, during which time the calculated PW value is maintained. As shown in FIG. 5, after TS timer is complete, the method 500 may proceed to step 65 (signaled as TSInc), where a TS index or number may increment by one, and the iteration process may begin once again. Each time when the drive starts or initiates, the time slice may be reset to zero in step 66.

In block 68, the controller may determine, based on the block 58, whether the output voltage is higher (denoted as +) or lower (denoted as −) than what is designed or required. If the output voltage is lower than the desired level, the method 500 proceeds to step 69, in which the controller may set port or pin 7 (also denoted as GP0 in FIG. 3) for continuous high on the FET 24, and may set port 2 (GP5) for the PWM output signal which controls the gate-drain voltage of the FET 23. Otherwise, if the output voltage is higher than the desired level, the method 500 proceeds to step 70, in which the controller may set port or pin 2 (GP5) for continuous high on the FET 23, and may set port 7 (GP0) for the PWM output signal which controls the gate-drain voltage of the FET 24. As described above and indicated by block 72, the controller may have the option to operate one of the boost FETs 23 and 24 in the third quadrant when the FET is reverse biased. After step 69 or step 70, the method 500 may return to step 65.

Figure 6:
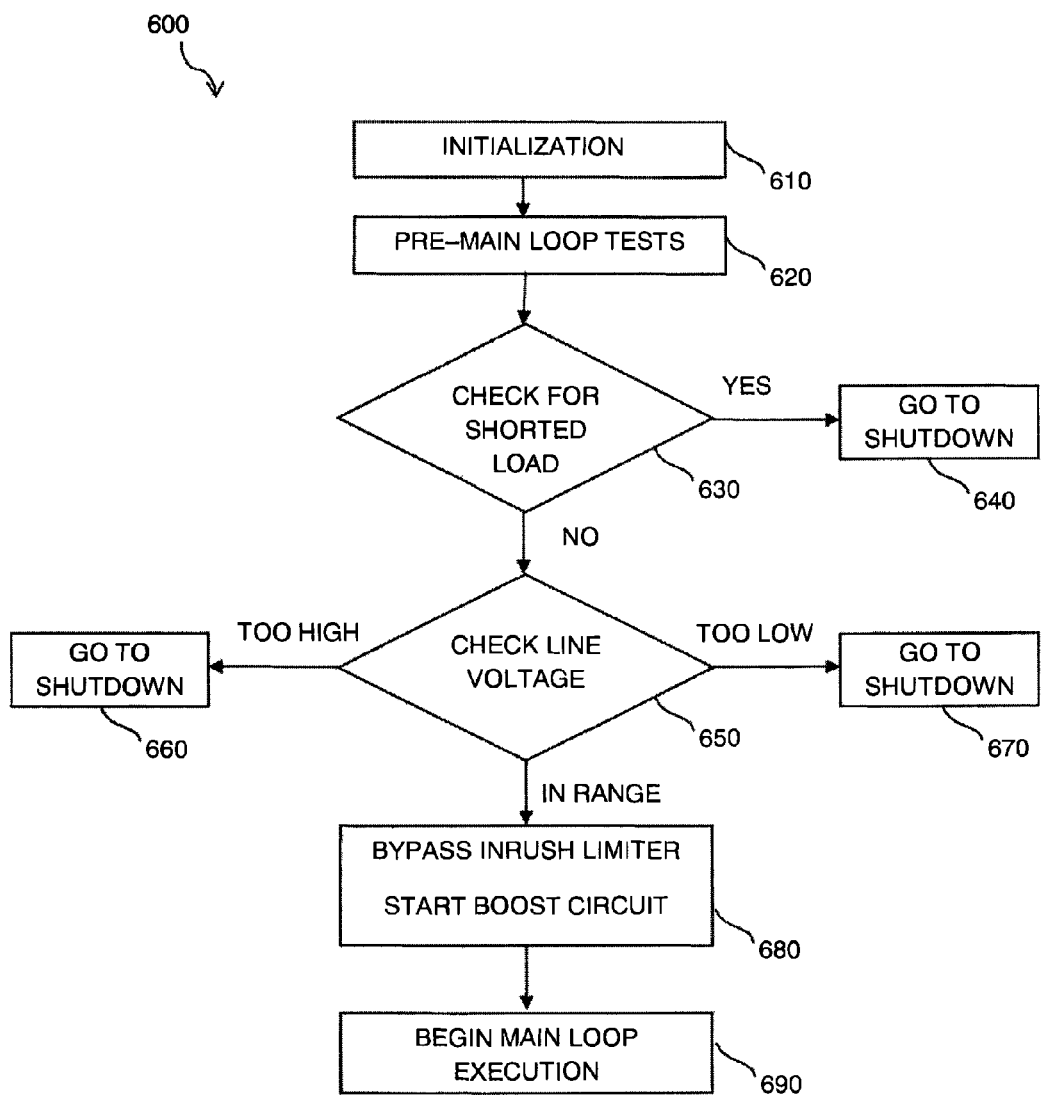
FIG. 6 is a flowchart of an embodiment of a pre-main loop initialization method.

FIG. 6 is a flowchart of an embodiment of a pre-main loop initialization method 600. The method 600 starts initialization in step 610. As shown in step 620, pre-main loop tests are performed. In step 630, shorted load is checked. If the condition in step 630 is met, the method 600 proceeds to step 640 to shut down the circuit system. In this case, the load is connected before boost operation and with the inrush limiter unbypassed. Further, the short circuit is configured as a power-on-reset (por) but can be configured as a recycling reset with a 20-second cycle time. Otherwise, if the condition in step 630 is not met, the method 600 proceeds to step 650 to check a line voltage.

If step 650 determines that the line voltage is too high (a high limit is 308 to 310 volts AC (vac)), the method 600 proceeds to step 660 for shutdown. Otherwise, if step 650 determines that the line voltage is too low (a low limit is 88 to 90 vac), the method 600 proceeds to step 670 for shutdown. Otherwise, if step 650 determines that the line voltage is in range, the method 600 proceeds to step 680 to bypass an inrush limiter and start a boost circuit. In steps 660 and 670, shutdown is recycling at 20 seconds per cycle. Although in shutdown the line is continuously monitored, once the line is in range normal operation will resume in 20 seconds. In step 690, the method 600 begins main loop execution.

FIGS. 7A-7D are flowcharts of an embodiment of a main loop method 700, which may be executed after initialization (e.g., after the method 600). The method 700 begins a main loop in step 701. The main drive starts in a third quadrant safe mode until execution of a first time slice interrupt call. In step 702, the method 700 starts a time slice (ts) timer (tmr1) at about 200 microseconds (usec) per slice at 60 Hz. The timer 1 (tmr1) is set for about 200 usec, and interrupt latency adds about another 20 usec. In step 703, the method 700 checks whether the "pass, 7" is high (HI). The "pass, 7" is an internal on/off flag—when electronic off is commanded, table read is halted but timer 1, communication ports, and line voltage continue to be monitored. If the condition in step 703 is met, the method 700 proceeds to step 704, where a table read is skipped. Otherwise, if the condition in step 703 is not met, the method 700 proceeds to step 705 to check whether a time slice number equals 1 (TS=1). As shown in block 710, time slices of a half cycle can be from number 0 (N=0) to a maximum number of 40 (N=40).

If the condition in step 705 is met, the method 700 proceeds to step 706 to get the first time slice (slice #1) from the sine table and increment the TS. Otherwise, if the condition in step 705 is not met, the method 700 proceeds to step 707 to check whether the TS number (N) equals 15 or 21. Note that sampling is executed twice at or near a peak line voltage. If the condition in step 707 is met, the method 700 proceeds to step 708 to get the TS number from the sine table, increment the TS value, and sample all analog to digital (A2D) channels. Otherwise, if the condition in step 707 is not met, the method 700 proceeds to step 709 to capture internal external analog channels.

Figure 7A:
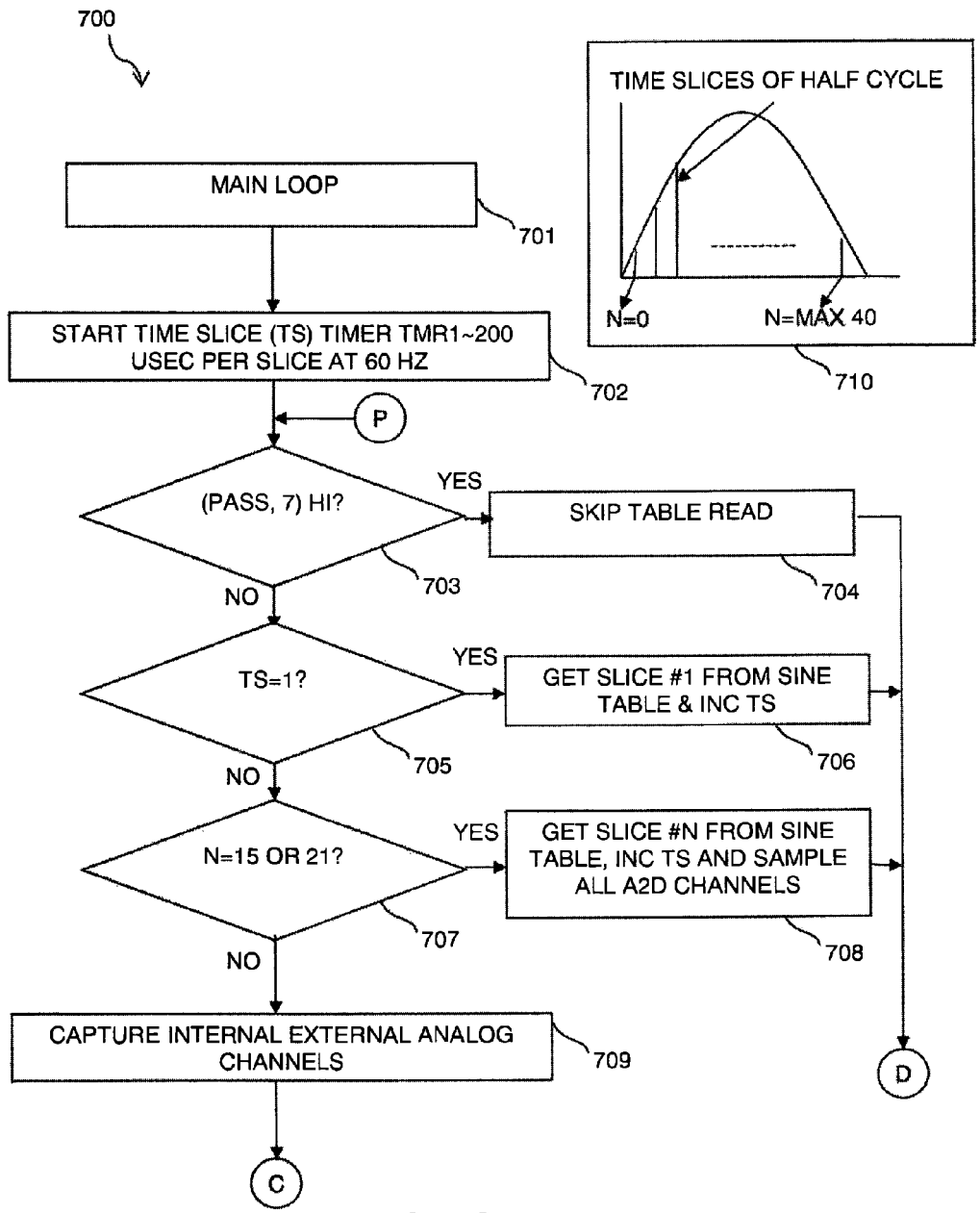
FIGS. 7A-7D are flowcharts of an embodiment of a main loop method.
Figure 7B:
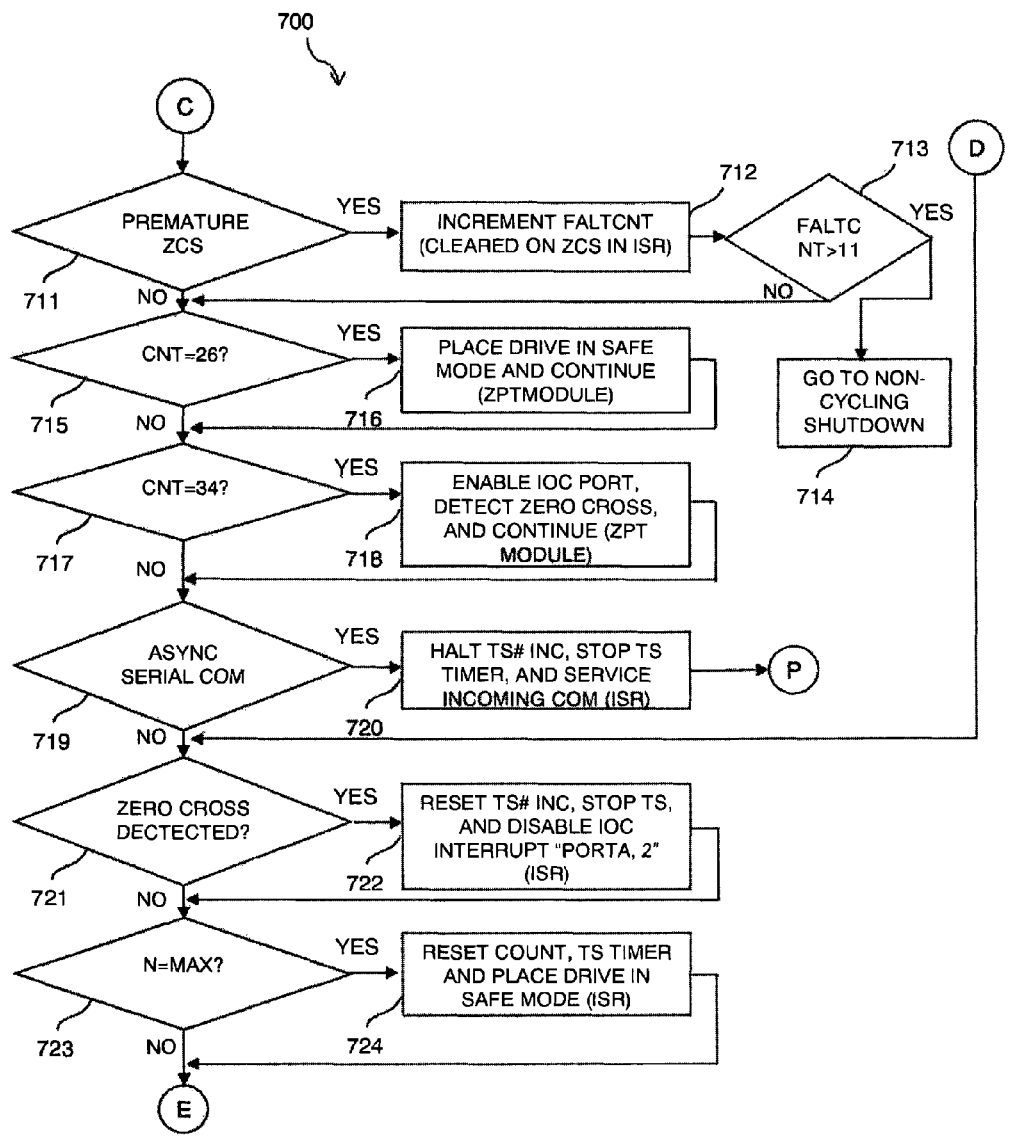

As shown in FIG. 7B, the method 700 continues in step 711 to check whether line voltage/current zero cross condition (ZCS) (meaning Zero Cross Sense) is premature. If the condition in step 711 is met, the method 700 proceeds to step 712 to increment a fault count (FALTCNT), which has been cleared on ZCS in an interrupt sub routine (ISR). Otherwise, if the condition in step 711 is not met, the method 700 proceeds to step 715 to check whether a count (CNT) equals 26. After step 712, the method 700 checks in step 713 whether the FALTCNT is greater than 11. If the condition in step 713 is met, the method 700 proceeds to step 714 to go to a non-cycling shutdown. Otherwise, if the condition in step 713 is not met, the method 700 proceeds to step 715.

If the condition in step 715 is met, the method 700 proceeds to step 716, which may be implemented by a zero-cross proximity test (ZPT) module, to place a drive in a safe mode and continue. Otherwise, if the condition in step 715 is not met, the method 700 proceeds to step 717 to check whether CNT equals 34.

If the condition in step 717 is met, the method 700 proceeds to step 718, which may be implemented by the ZPT module, to enable an input/output controller (InterruptOnChange) port, to detect zero cross and continue. Otherwise, if the condition in step 717 is not met, the method 700 proceeds to step 719 to check asynchronous serial communications (ASYNC SERIAL COM).

If the condition in step 719 is met, the method 700 proceeds to step 720, which may be implemented in interrupt sub routine (ISR), to halt the incrementing of TS number, stop the TS timer and service incoming communications. The asynchronous digital communication is not fixed positionally in a flow and may occur anytime during normal operation. During this period the drive is in safe mode. The drive will re-enter the flow with the last TS number. After the step 720, the method 700 may re-entry to main flow occurs after block 702. If the condition in step 719 is not met, the method 700 proceeds to step 721 to detect the zero cross. The zero cross interrupt detection is only enabled after the time slice count has exceeded 34. However, the IOC flag for bit "porta, 2" is checked continuously for anomalous port activity.

If the zero cross is detected in step 721, the method 700 proceeds to step 722 to reset the TS number increment, stop TS, and disable IOC interrupt "porta, 2". Otherwise, if the zero cross is not detected in step 721, the method 700 proceeds to step 723 to check whether the TS number has reached the maximum value (N=MAX).

If the condition in step 723 is met, the method 700 proceeds to step 724, which may be implemented in ISR, to reset count and TS timer, and place the drive in safe mode. Step 724 may be required because occurrence of the maximum count should not occur. If the condition in step 723 is not met, the method 700 proceeds to step 725.

Figure 7C:
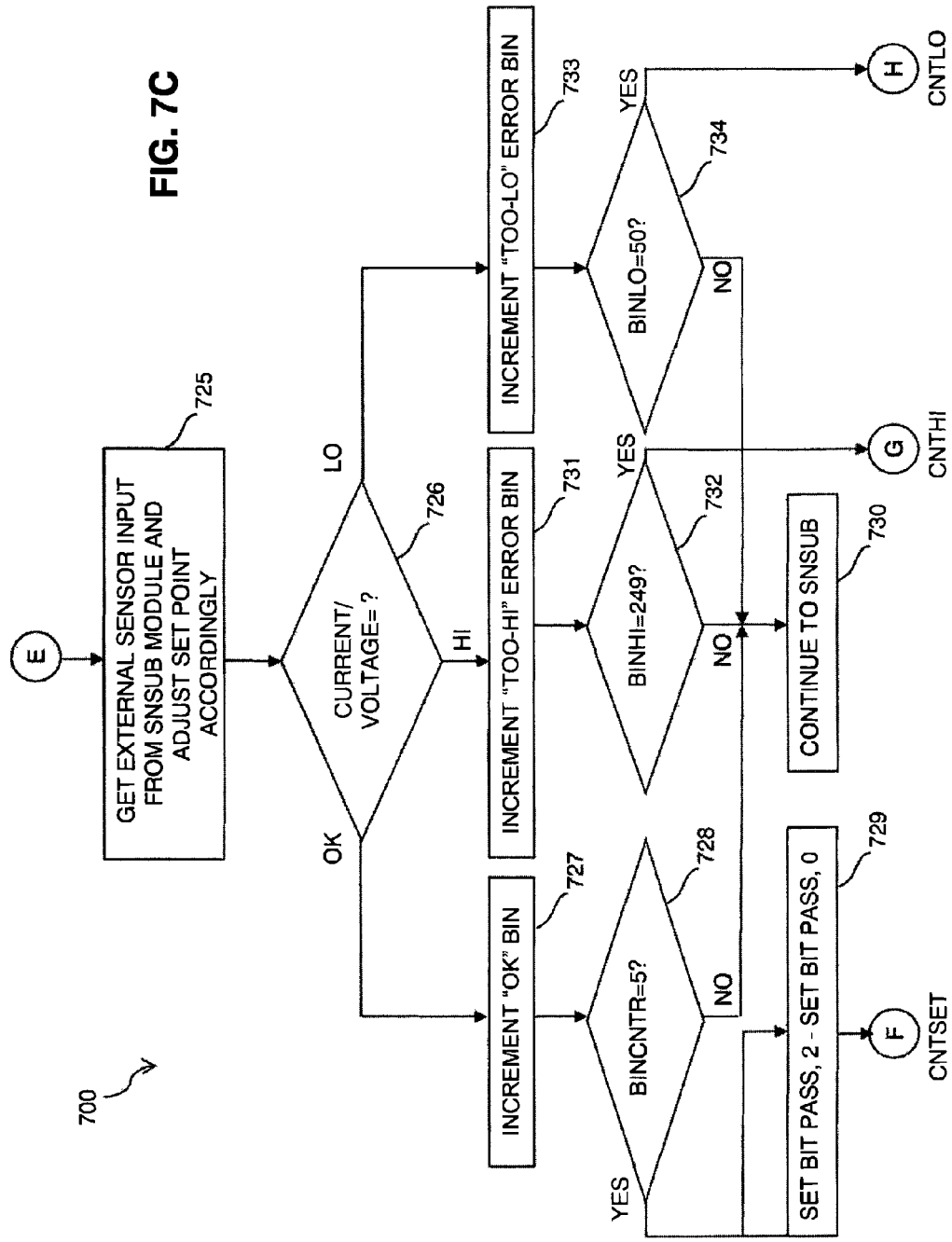

As shown in FIG. 7C, the method 700 continues in step 725 to get external sensor input from an SNSUB (SeNsor SUBroutine acquires sensed condition from analog inputs) module and adjust a set point accordingly. The SNSUB module averages and corrects the analog input from the capture module control request. Then, in step 726, the method 700 checks whether the current or voltage is okay (OK), high (HI), or low (LO). The current or voltage depends on bit 0 of a "CONFIGOP" (CONFIGure OPeration) byte, wherein 0 is a constant voltage, and 1 is a constant current. The actual comparing number comes out of the SNSUB module.

If the condition in step 726 is okay, the method 700 proceeds to step 727 to increment an "OK" bin. Bins are preloaded with compliment numbers of the desired count. After step 727, the method 700 checks in step 728 whether a bin counter (BINCNTR) equals 5. If the condition in step 728 is met, the method 700 proceeds to step 729 to set bit as "pass, 2" or set bit as "pass, 0". The "pass, 2" is data-ready for transfer to the boost control "LOADPW" module, which inhibits any further control modification until the last control word is transferred. When transfer "pass, 2" is cleared, "pass, 0" is set value acquired flag. After step 729, the method 700 proceeds following the route denoted as CNTSET. Otherwise, if the condition in step 728 is not met, the method 700 proceeds to step 730 to continue to SNSUB.

If the condition in step 726 is high, the method 700 proceeds to step 731 to increment a "too-high" error bin. Bins are preloaded with compliment numbers of the desired count. After step 731, the method checks in step 732 whether a bin counter denoted as BINHI equals 249. If the condition in step 732 is met, the method 700 proceeds following the route denoted as CNTHI. Otherwise, if the condition in step 732 is not met, the method 700 proceeds to step 730.

If the condition in step 726 is high, the method 700 proceeds to step 733 to increment a "too-low" error bin. Bins are preloaded with compliment numbers of the desired count. After step 733, the method checks in step 734 whether a bin counter denoted as BINLO equals 50. If the condition in step 734 is met, the method 700 proceeds following the route denoted as CNTLO. Otherwise, if the condition in step 734 is not met, the method 700 proceeds to step 730.

Figure 7D:
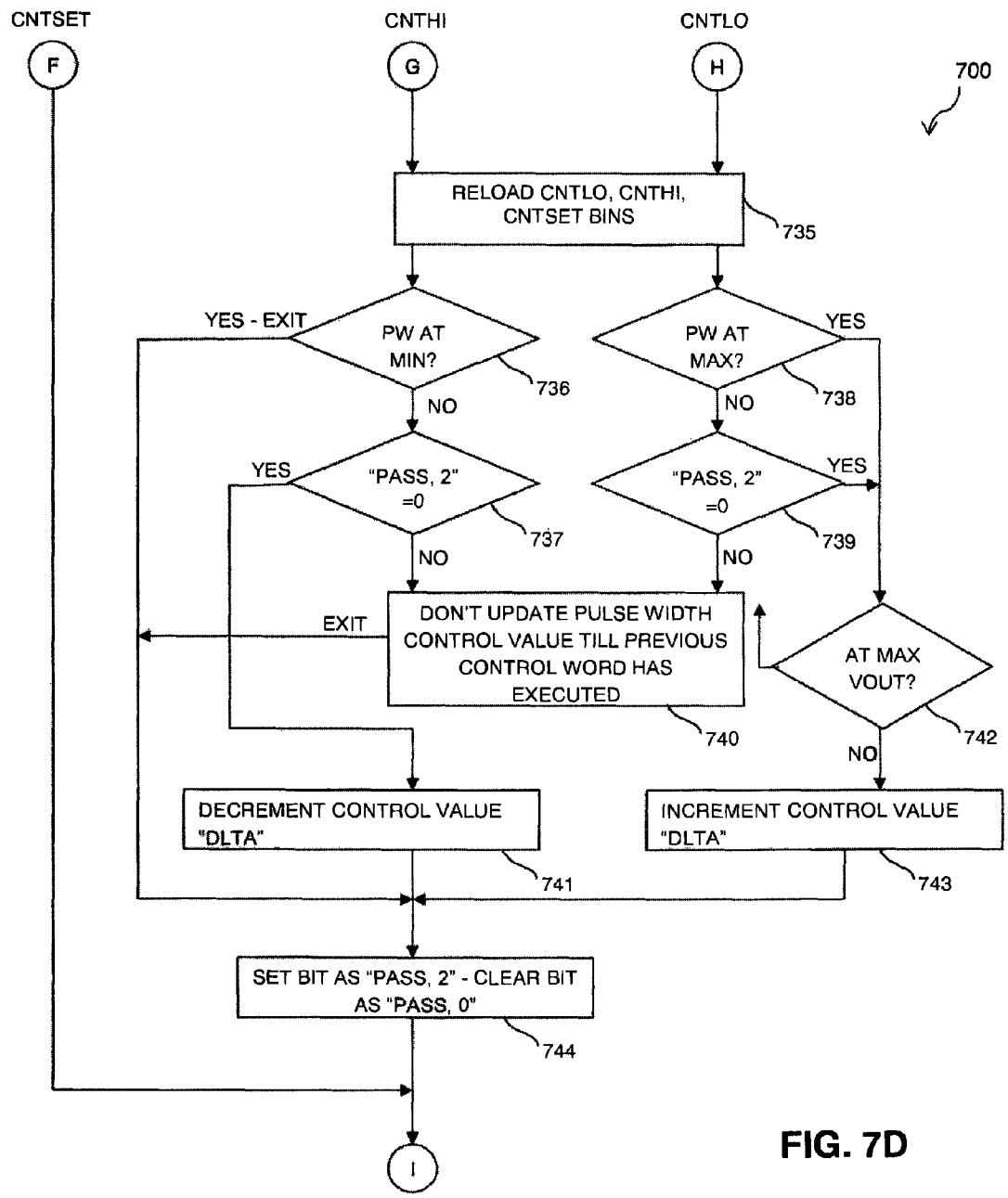

As shown in FIG. 7D, the CNTHI and CNTLO routes continue in step 735, in which the method 700 reloads the CNTLO, CNTHI, CNTSET bins. In the CNTHI route, after step 735, the method 700 checks in step 736 whether a pulse width (PW) is at a minimum value. If a call for a higher output occurs and the unit is at the maximal output voltage, output PW increment is disallowed, and the "too-high" bin is incremented.

If the condition in step 736 is met, the method 700 proceeds to step 744 to set bit as "pass, 2" or clear bit as "pass, 0". The "pass, 2" does not allow further control updates until the last update has executed. The update occurs on a whole half cycle count. The updates take effect starting at zero cross, never at mid half-cycle. Otherwise, if the condition in step 736 is not met, the method 700 proceeds to step 737 to check whether the "pass, 2" bit equals zero.

If the condition in step 737 is met, the method 700 proceeds to step 741 to decrement a control value denoted as DLTA. Otherwise, if the condition in step 737 is not met, the method 700 proceeds to step 740, where the method 700 does not update pulse width control value till a previous control word has executed.

In the CNTLO route, after step 735, the method 700 checks in step 738 whether the PW is at a maximal value. If the condition in step 738 is met, the method 700 proceeds to step 742 to check whether an output voltage (VOUT) is at a maximal value. Otherwise, if the condition in step 738 is not met, the method 700 proceeds to step 739 to check whether the "pass, 2" bit equals zero. If the condition in step 739 is met, the method 700 proceeds to step 742. Otherwise, if the condition in step 739 is not met, the method 700 proceeds to step 740.

If the condition in step 742 is not met, the method 700 proceeds to step 743 to increment the control value denoted as DLTA. After step 741 or step 743, the method 700 proceeds to step 744.

As shown in FIG. 7D, the method 700 continues in step 745 to create a 4-point average of a 10-bit output analog control input. Next, the method 700 checks in step 746 whether there is a third pass. If the condition in step 746 is not met, the method 700 proceeds to step 747 to loop back to the beginning of the main loop. Otherwise, if the condition in step 739 is met, the method 700 proceeds to step 748 to average four new captures.

Next, in step 749, the method 700 gets the control input from the analog channel. In step 750, the method 700 checks whether an external control value is greater than zero. If the condition in step 750 is met, the method 700 proceeds to step 751 to increase or reduce a comparator value with the external input and add in a compensation value. External control may be executed through a serial port where there is a digital value, comparator value, that is set anew if lower or higher power is requested. Once the new value is equilibrated, the control may make small changes to maintain, compensation value. Otherwise, if the condition in step 750 is not met, the method 700 proceeds to step 752 to check whether a temperature value is greater than 85.

If the condition in step 752 is met, the method 700 proceeds to step 753 to reduce the comparator value with a thermal compensation value if such an option is applied. Step 752 is optional and for the moment can be included in a normal flow. The amount of reduction in step 753 is configurable. Otherwise, if the condition in step 752 is not met, the method 700 proceeds to step 754 to go to the start of the main loop.

Figure 8:
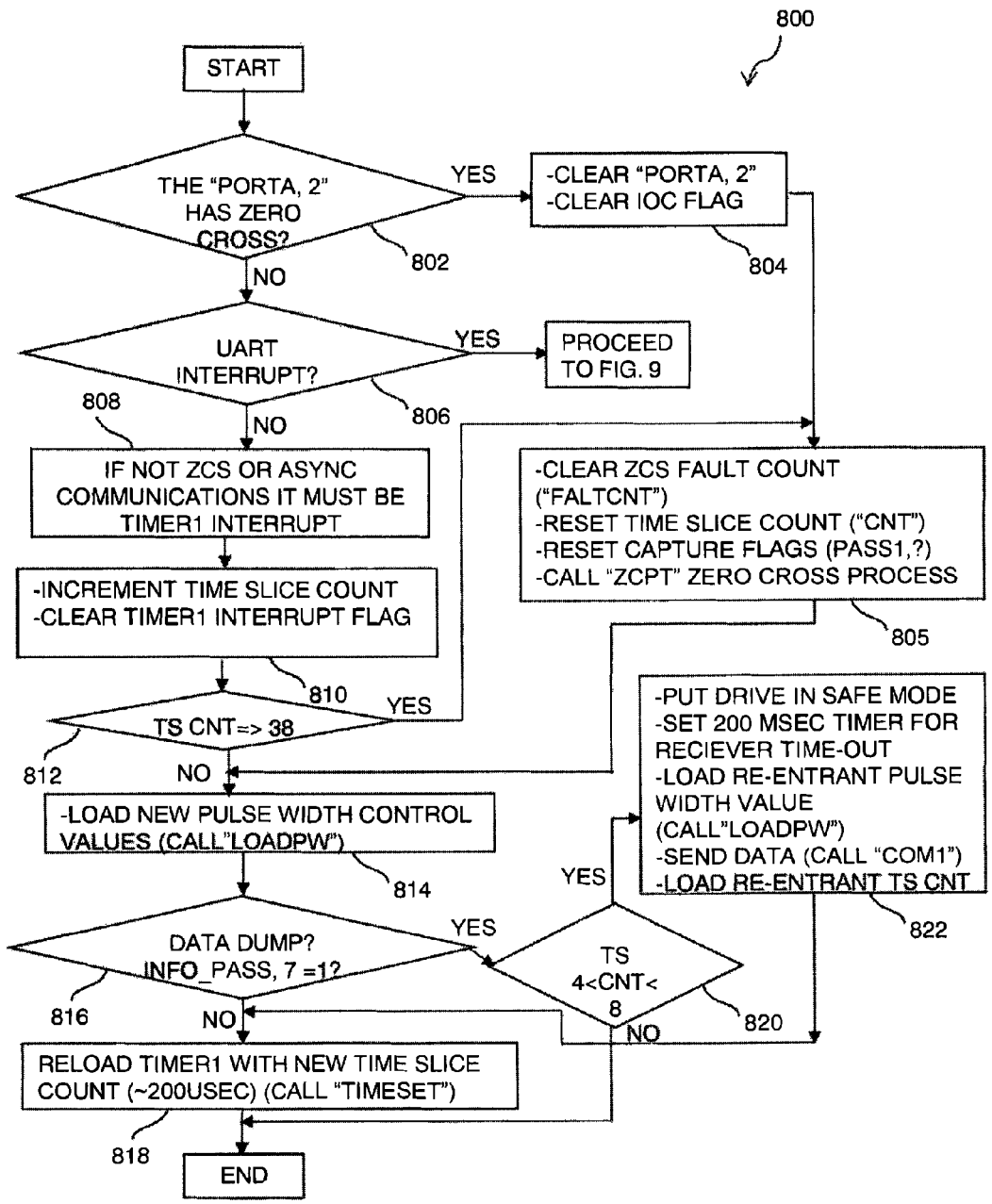
FIG. 8 is a flowchart of an embodiment of an interrupt sub routine method.

FIG. 8 is a flowchart of an embodiment of an interrupt sub routine method 800. The method 800 may be inserted into or combined with other methods disclosed herein, e.g., being executed before step 721 of the method 700. Starting in step 802, the method 800 checks or determines whether the "porta, 2" has a change of state and therefore a zero cross. The zero cross switch has the highest priority. If the condition in step 802 is met, the method 800 proceeds to step 804 to clear the "porta, 2" and clear the IOC flag. Otherwise, if the condition in step 802 is not met, the method 800 proceeds to 806 to check whether there is a universal asynchronous receiver/transmitter (UART) interrupt. The UART has the lowest priority. After step 804, the method 800 in step 805 clears the ZCS FALTCNT, resets the TS count, resets capture flags (pass1, ?), and call a zero cross process denotable as ZCPT.

If the condition in step 806 is met, the method 800 proceeds to steps in method 900 that will be described later. Otherwise, if the condition in step 806 is not met, the method 800 proceeds to step 808 to determine that, if not ZCS or ASYNC communications, it must be a timer1 interrupt. The timer1 interrupt has the second highest priority. In step 810, the method 800 increments the TS count and clears the timer1 interrupt flag.

In step 812, the method 800 checks whether the TS count is equal to or greater than 38. If so, the method 800 proceeds to step 805; otherwise the method 800 proceeds to step 814, in which new PW control values are loaded (by calling a process LOADPW).

The method 800 checks in step 816 whether there is a data dump and whether "info_pass, 7" equals one. If the condition in step 816 is not met, the method 800 proceeds to step 818, in which the timer1 with a new TS count (about 200 usec) is reloaded (by calling TIMESET). Otherwise, if the condition in step 816 is met, the method 800 proceeds to step 820 to check whether the TS count is between the values of 4 and 8.

If the condition in step 820 is met, the method 800 proceeds to step 822, in which the method 800 puts the drive in safe mode, sets 200 msec timer for receiver time-out, loads re-entrant PW value (by calling "LOADPW"), sends data (by calling "COM1"), and loads re-entrant TS count. Step 822 is followed by step 818. Otherwise, if the condition in step 820 is not met, the method 800 ends.

Figure 9A:
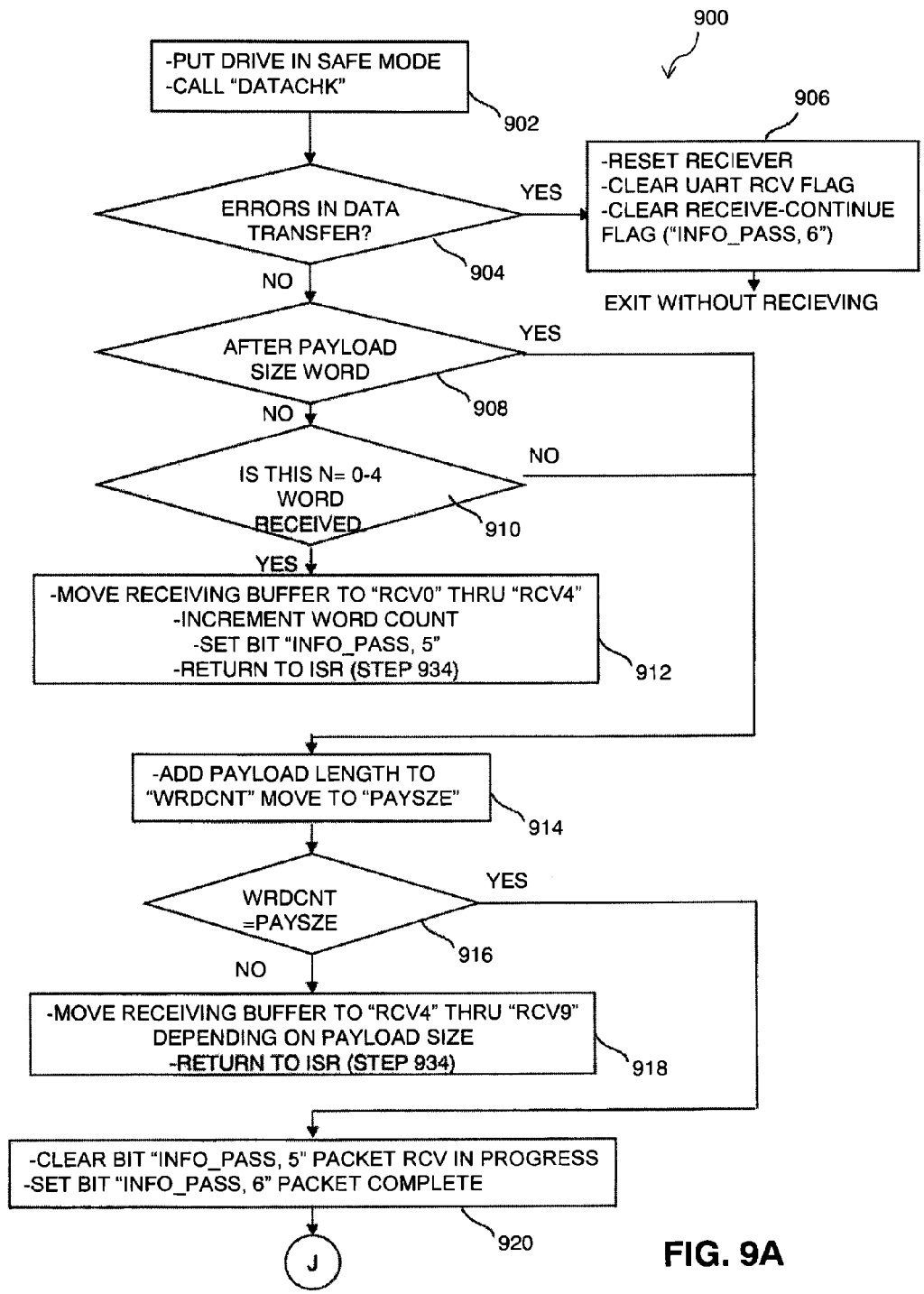
FIG. 9A and FIG. 9B are flowcharts of an embodiment of a universal asynchronous receiver/transmitter (UART) receive interrupt method.
Figure 9B:
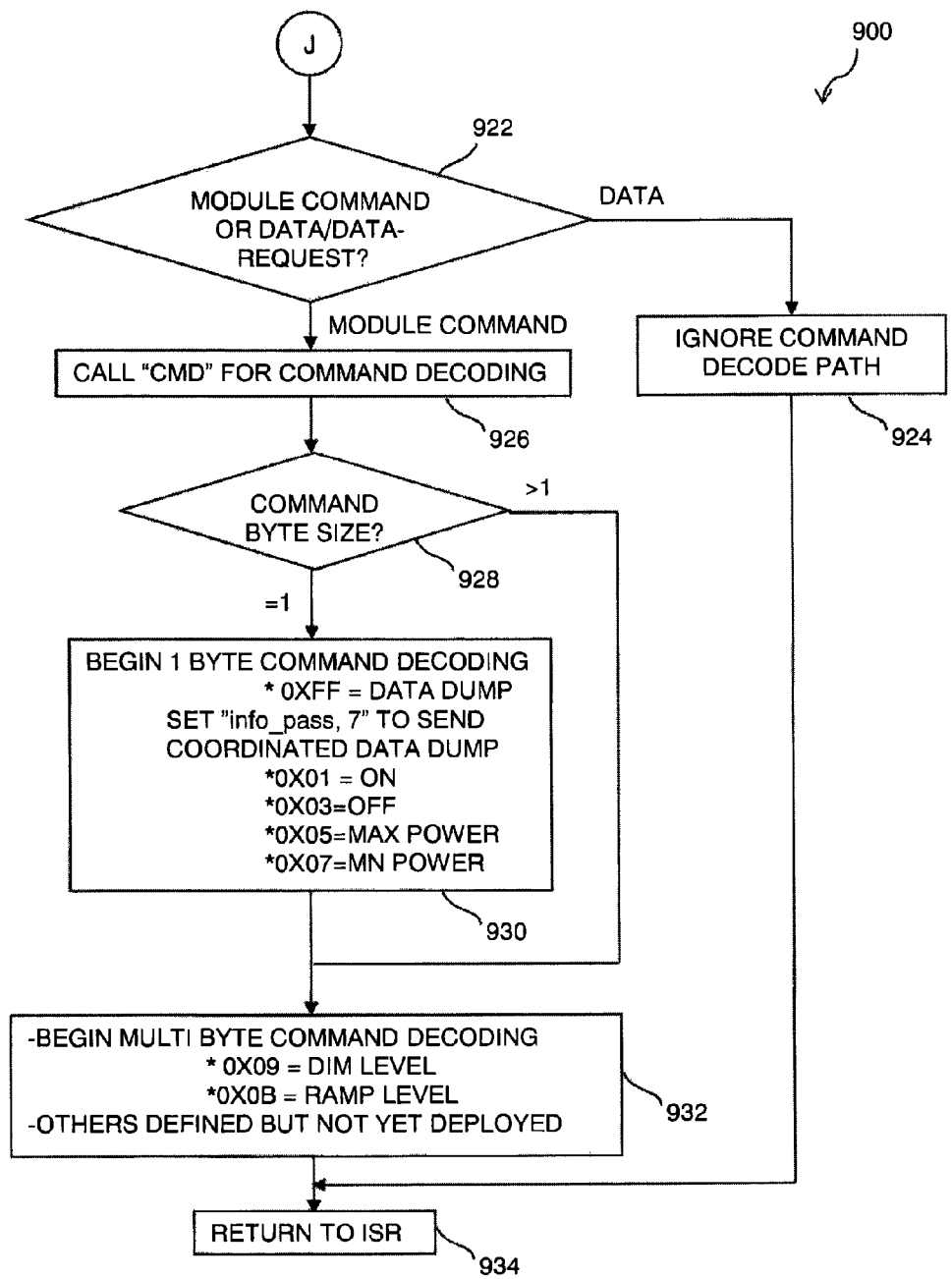

FIG. 9A and FIG. 9B are flowcharts of an embodiment of a UART receive interrupt method 900. A main drive starts in a third quadrant safe mode until execution of a first time slice interrupt call. Starting in step 902, the method 900 puts the driver in a safe mode and calls a data checking function denoted as "DATACHK". In step 904, the method 900 determines whether there are errors in data transfer. If the condition in step 904 is met, the method 900 proceeds to step 906, in which the method 900 resets the receiver, clears the UART receiving (RCV) flag, and clears a receive-continue flag denoted as "info_pass, 6". The method 900 exits without receiving after step 906. If the condition in step 904 is not met, the method 900 proceeds to step 908 to check a payload size word).

If the condition in step 908 is met, the method 900 proceeds to step 914, where a payload length is added to a word count (WRDCNT) and moved to a payload size (PAYSZE). Otherwise, if the condition in step 908 is not met, the method 900 proceeds to step 910 to determine whether the N=0-4 word is received.

If the condition in step 910 is met, the method 900 proceeds to step 912, where the method 900 moves a receiving buffer to "RCV0" through "RCV4", increments the word count, and sets the bit "info_pass, 5". Step 912 is designed for 2 pre-amble bytes, 2 address bytes, 1 payload size byte, and 4 data bytes—that is 9 bytes in total. The byte size is fixed only by design and can be expanded. Currently, the address is handled at the transport layer or level and not at the machine level. The method 900 returns to ISR (as in step 934) after step 912. If the condition in step 910 is not met, the method 900 proceeds to step 914.

The method 900 checks in step 916 whether the word count equals the payload size (i.e., WRDCNT=PAYSZE). If the condition in step 916 is met, the method 900 proceeds to step 920 to clear the bit "info_pass, 5" packet as receiving in progress and set the bit "info_pass, 6" packet as complete. "info_pass, 5" is an incoming packet receive flag and is set till packet receive is complete, and "info_pass, 6" flags a complete data packet that is ready to parse. Otherwise, if the condition in step 916 is not met, the method 900 proceeds to step 918 to move the receiving buffer to "RCV4" through "RCV9" depending on payload size and return to ISR (as in step 934).

As shown in FIG. 9B, after step 920, the method 900 proceeds to step 922 to check whether the received data is a module command or data/data-request. If the received data is a data, the method 900 proceeds to step 924 to ignore the command decode path. Otherwise, if the received data is a module command, the method 900 proceeds to step 926 to call commend "CMD" for command decoding. The command size is determined by payload size capture.

In step 928, the method checks whether a command byte size is equal to 1 or greater than 1. If the command byte size is equal to 1, the method 900 proceeds to step 930 to begin 1 byte command decoding (* 0XFF=DATA DUMP) and set the "info_pass, 7" to send the coordinated data dump (*0X01=ON, *0X03=OFF, *0X05=MAX POWER, *0X07=MN POWER). Otherwise, if the command byte size is greater than 1, the method 900 skips step 930 and proceeds to step 932, where multi byte command decoding beings (* 0X09=DIMLEVEL, *0X0B=RAMP LEVEL). The method 900 returns to ISR in step 934.

Figure 10A:
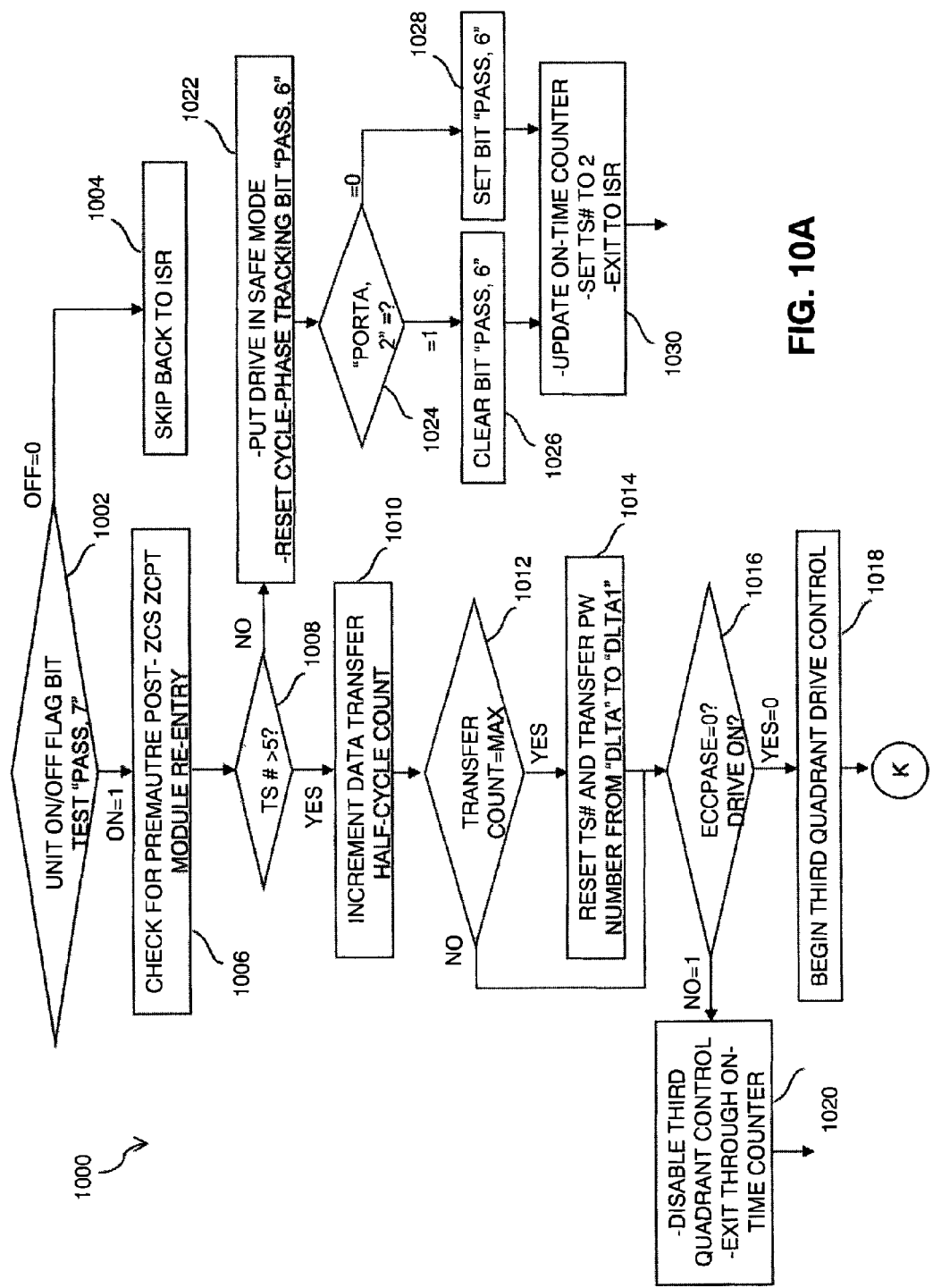
FIG. 10A and FIG. 10B are flowcharts of an embodiment of another method.
Figure 10B:
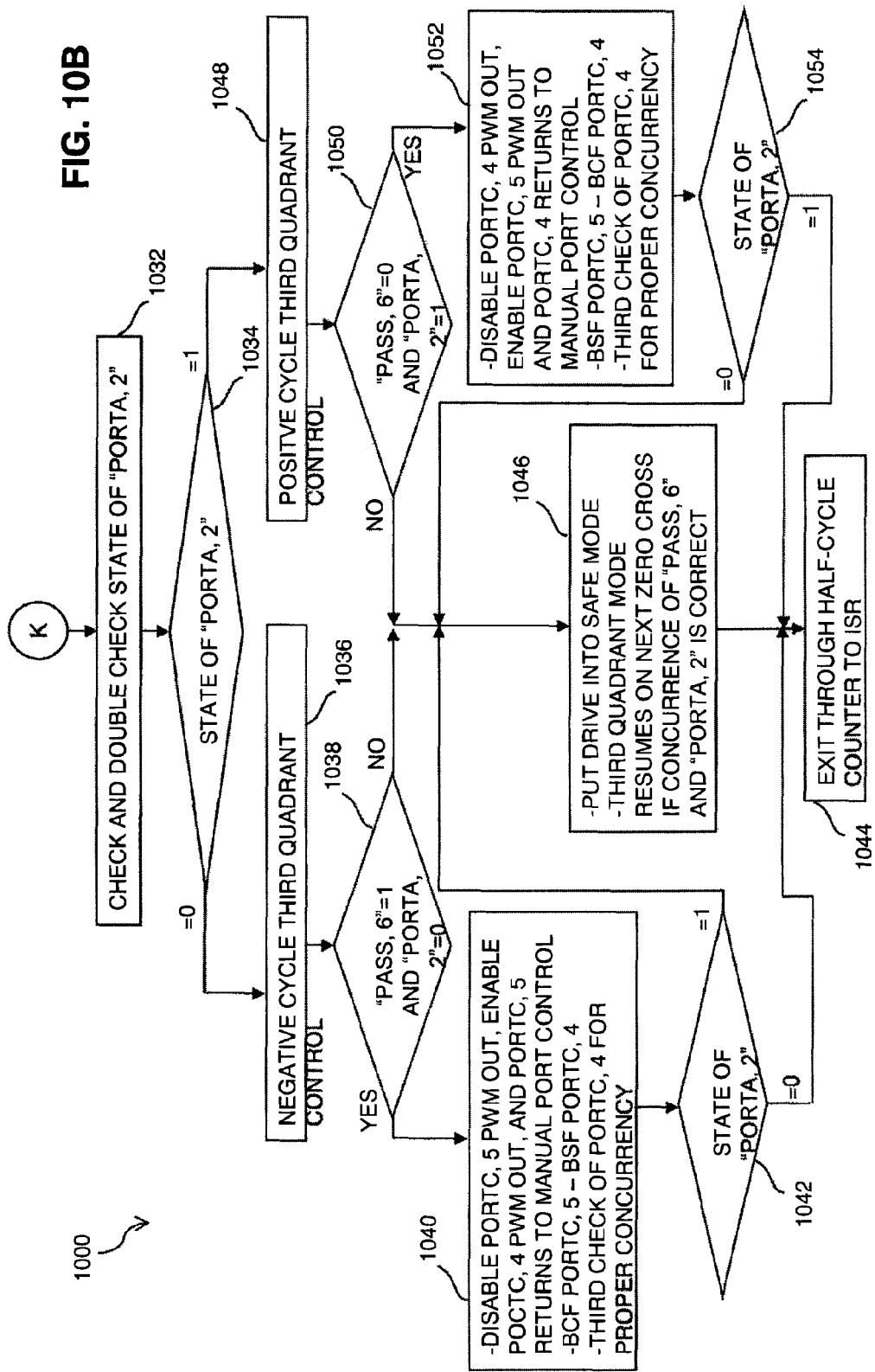

FIG. 10A and FIG. 10B are flowcharts of an embodiment of a method 1000 implemented in a zero cross process module denoted as "ZCPT". The method 1000 may be initiated by step 805 of the method 800. Starting in step 1002, the method 1000 checks whether a unit flag bit is on or off by testing "pass, 7". If the flag is off (OFF=0), the method 1000 proceeds to step 1004 to skip back to ISR. Otherwise if the flag is on (ON=1), the method 1000 proceeds to step 1006 to check for a premature post-ZCS ZCPT module re-entry.

In step 1008, the method 1000 checks whether a TS number is greater than five. If the condition in step 1008 is met, the method 1000 proceeds to step 1010 to increment a data transfer half-cycle count. Otherwise, if the condition in step 1008 is not met, the method 1000 proceeds to step 1022. Power corrections are introduced over whole half cycles. The number of whole half cycles is set for best stability. The number is static but can be made mutable for several reasons (e.g., for extended dimming times).

After step 1010, the method 1000 checks in step 1012 whether the transfer count has reached a maximal value. If the condition in step 1012 is met, the method 1000 proceeds to step 1014 to reset the TS number and transfer a PW number from "DLTA" to "DLTA1". Otherwise, if the condition in step 1012 is not met, the method 1000 skips step 1014 and proceeds to step 1016, where the method checks whether an ECCPASS=0 (ECCPAS is a bit of a control byte used to configure the PWM generator where, ECCPASS=0 means PWM output is ON, ECCPASS=1 means drives are OFF) and whether the drive is on.

If the condition in step 1016 is met, the method 1000 proceeds to step 1018 to begin third quadrant drive control. Otherwise, if the condition in step 1012 is not met, the method 1000 proceeds to step 1020 to disable the third quadrant drive control and exit through an ON-time counter.

In step 1022, the method 1000 puts the drive in the safe mode and resets the cycle-phase tracking bit "pass, 6". Next, the method 1000 checks in step 1024 whether "porta, 2" equals one or zero. The "porta, 2" is "1" on negative half cycles and "0" on positive. This is used to cross reference it to the next cycle as the next half cycle will be a mismatched, expected condition versus a matched condition that is unexpected and potentially destructive. This condition could be caused excessive noise in the zero cross signal or failure of zero-cross detector. If "porta, 2" equals one, the method 1000 proceeds to step 1026 to clear the bit "pass, 6". Otherwise, if "porta, 2" equals zero, the method 1000 proceeds to step 1028 to set the bit "pass, 6". Next in step 1030, the method 1000 updates the ON-time counter, sets the TS number to 2, and exits to ISR.

After step 1018, the method 1000 checks and double-checks the state of "porta, 2" in step 1032. In step 1034, the method 1000 determines whether the state of "porta, 2" equals one or zero. If "porta, 2" equals zero, the method 1000 proceeds to step 1036 for third quadrant control in the negative cycle. Otherwise, if "porta, 2" equals one, the method 1000 proceeds to step 1048 for third quadrant control in the positive cycle.

In step 1038, the method 1000 determines whether "porta, 2" equals zero and whether "pass, 6" equals one. If the condition in step 1038 is met, the method 1000 proceeds to step 1040. Otherwise, if the condition in step 1038 is not met, the method 1000 proceeds to step 1046.

In step 1040, the method 1000 disables "portc, 5" PWM out, and enables "poctc, 4 PWM out, and "portc, 5". The method 1000 returns to manual port control (BCF "portc, 5", BSF "portc, 4"), and does a third check of "portc, 4" for proper concurrency.

In step 1042, the method 1000 determines whether the state of "porta, 2" equals one or zero. If "porta, 2" equals zero, the method 1000 proceeds to step 1044 to exit through the half-cycle counter to ISR. Otherwise, if "porta, 2" equals one, the method 1000 proceeds to step 1046 to put the drive into the safe mode, resume the third quadrant mode on next zero cross if concurrence of "pass, 6" and "porta, 2" is correct.

After step 1048, the method 1000 determines in step 1050 whether "porta, 2" equals one and whether "pass, 6" equals zero. If the condition in step 1050 is met, the method 1000 proceeds to step 1052. Otherwise, if the condition in step 1050 is not met, the method 1000 proceeds to step 1046.

In step 1052, the method 1000 disables "portc, 4" PWM out, and enables "poctc, 5 PWM out, and "portc, 4". The method 1000 returns to manual port control (BSF "portc, 5", BCF "portc, 4"), and does a third check of "portc, 4" for proper concurrency.

In step 1054, the method 1000 determines whether the state of "porta, 2" equals one or zero. If "porta, 2" equals zero, the method 1000 proceeds to step 1046. Otherwise, if "porta, 2" equals one, the method 1000 proceeds to step 1044.

Figure 11:
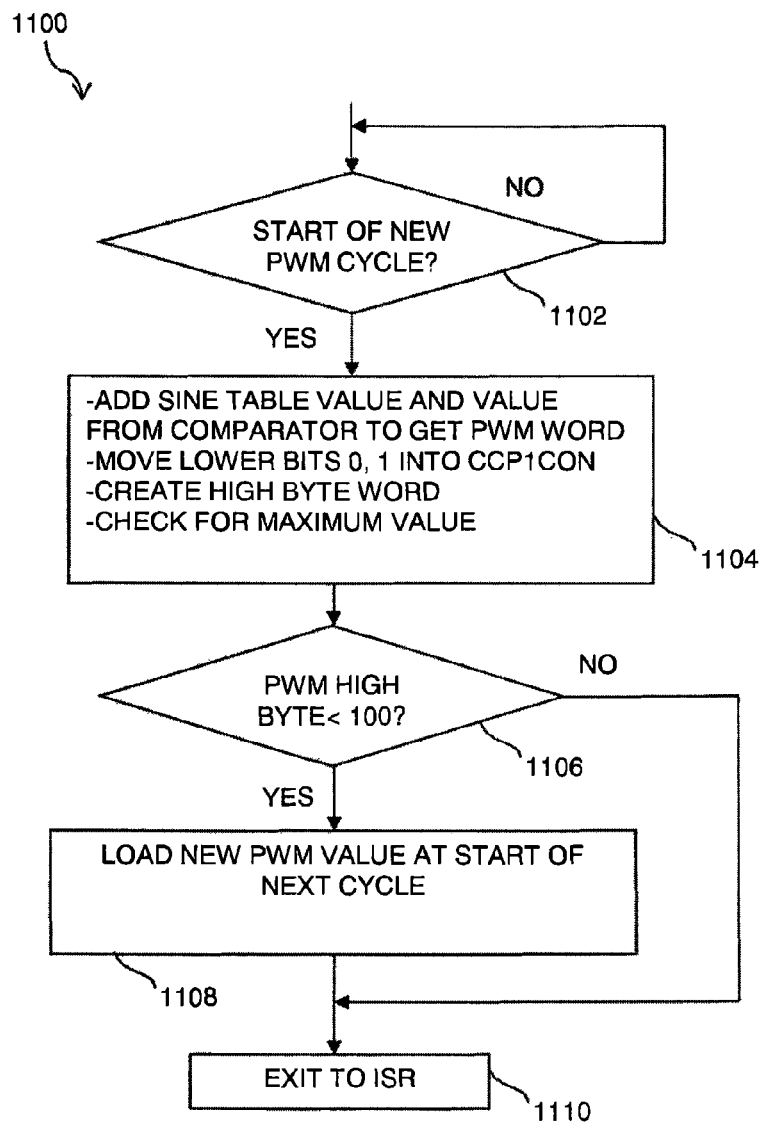
FIG. 11 is a flowchart of an embodiment of yet another method.

FIG. 11 is a flowchart of an embodiment of a method 1100 implemented in the LOADPW module. Starting in step 1102, the method 1100 checks or determines whether the start of a new PWM cycle has arrived. The method 1100 keeps checking until the condition in the step 1102 has been met. Next in step 1104, the method 1100 adds a sine table value and a value from the comparator to get a PWM word. Further, the method 1100 moves lower bits 0, 1 into CCP1CON (The PWM control byte is a 10 bit digital word and this is an 8 bit controller, the first 8 high bits has its own register with the two lower bytes stored in the register called CCP1CON, they are concatenated for use by the PWM generator), creates a high byte word, and checks for a maximum value.

In step 1106, the method 1000 determines whether a PWM high byte is less than 100. If the condition in step 1106 is met, the method 1000 proceeds to step 1108 to load a new PWM value at the start of the next cycle. Otherwise, if the condition in step 1106 is not met, the method 1100 skips step 1108 and proceeds to step 1110 to exit to ISR.

As one of ordinary skill in the art will understand, module initialization can be performed following Tables 1-4.

TABLE 1

| port a | |
| --- | --- |
| RA0 | Analog input an0 a2d - for output current |
| RA1 | Analog input an1 - for line voltage |
| RA2 | Digital - zero cross and cycle phase detect - IOC enabled |
| RA4 | Oscillator input |
| RA5 | Oscillator input |

TABLE 2

| Port b | |
| --- | --- |
| RB4 | Analog input - an10 - for temperature capture |
| RB5 | Digital input - UART receive input |
| RB6 | Digital output - output switch control |
| RB7 | Digital output - UART transmit |

TABLE 3

| Port c | |
| --- | --- |
| RC0 | Not used digital output - initialized high |
| RC1 | Digital input - high speed shut down detect |
| RC2 | Digital output - controls inrush limiter drive |
| RC3 | Analog input - analog sensor input |
| RC4 | PWM output - p1b |
| RC5 | PWM output - p1a |
| RC6 | Analog input - CMC noise and signal input |
| RC7 | Analog input - output load voltage capture |

TABLE 4

| EEPROM schedule (all values in hex) | | |
| --- | --- | --- |
| Address | Value | Use |
| 00 | 05 | Time slice seed value |
| 01 | 0E | PWM seed value |
| 02 | 01 | Configuration word ci = 1 cv = 0 |
| 03 | 14 | Low byte of max voltage word ~.5 volt/cnt @ 10 bit |
| 04 | 03 | High byte of max voltage word |
| 05 | 01 | Low byte of minimum voltage control |
| 06 | 02 | High byte of minimum voltage control |
| 07 | 14 | Low byte of maximum current word ~1 ma/cnt @ 10 bit |
| 08 | 02 | High byte of maximum current word |
| 09 | 1E | Low byte of minimum current word |
| 0A | 00 | High byte of minimum current word |
| 0B | 89 | Compliment of the too-low error accumulator - note a |
| 0C | 01 | Compliment of the too-high error accumulator |
| 0D | EF | Compliment of the no-error accumulator |
| 0E | 14 | Hysteresis of compare values |
| 0F | FD | Number of whole half-cycle counts before PWM change |
| 1000 | 06 | Size of the data dump stack |
| 1001 | 01 | Unit type - value describes what the unit is |
| 1002 | 81 | SPBRG - low baud rate byte |
| 1003 | 00 | SPBRGH - high byte of |

Note that addresses OB-OF in Table 4 may affect stability.

In main oscillator and timers, a main clock is established by ceramic type operating at maximum speed of 20 megahertz (mhz). Timer0-tmr0 may not be used, but may be configured at /16. Timer1-tmr1 may be set for 1 time slice or 200 usec. Further, Timer2-tmr2-PWM drive generator clock-pr2=120 with pre-scale may be set to 1 for a frequency of 50 to 51 KHz.

In initial pre-operation tests, a short circuit test may be followed by a line voltage test, which indicates no start below 90 volts AC (vac) or above 305 vac.

In an embodiment of prestart conditions, ECCPAS may be configured to pull PWM outputs p1a and p1b high on shutdown event. PWM outputs p1b and p1a may be configured for safe third quadrant operation (both have the same PWM signal). UART may be configured to 38,400 baud rate and initially off (enabled 2 seconds after operation begins). Interrupts—IOC may be on "porta, 2", timer1 and UART receive (after 2 second delay). Start is coordinated to zero cross to reduce inrush.

In an embodiment, the main loop can be operated using the following steps or aspects denoted as steps A-L. Specifically, step A reads value of the sine table with current TS number to set phase-angle coordinated PWM boost values.

Step B "capture" may coordinate capture from analog channels and perform safety and level checks. Sample rate on all analog channels is 240 slices per second. In step B, load voltage may be sampled (e.g., load over-voltage test is applied). Load current may be sampled (e.g., load over-current TEST is applied, and/or load under-current is applied—(open circuit test)). Further, sensor input may be sampled. Internal temperature may be sampled (e.g., configured to allow power roll off at selected temperatures, and/or configured to shut down at internal temperatures at or above 110 Celsius). Line voltage may be sampled near the peak of the line voltage (e.g., over-voltage will cause shutdown until condition is removed, and under-voltage will cause shutdown until condition is removed).

Step C "SNSSUB" processes the captured analog input by taking a 4 point average, adding any compensation and providing the comparator with the control level desired. Step C may include averaging analog sensor input(s), checking for any control curve mitigation adjustment, and checking for power-reduction call due to temperature.

Step D "ZPT" zero cross proximity test monitors the time slice count. Step D may check each time slice after zero cross up to a count of 29 and increments how many false zero cross events occurred since the last correct zero cross (FALTCNT). If FALTCNT reaches 11, the unit is shutdown in a non-recycling shutdown. Note that a probable cause is failure of the zero cross detector of arc noise either internal or in the external load.

Step E "DIMAV" creates the final comparator values as specified in the CONFIGOP word, current or voltage. The comparator applies hysteresis level preset in EEPROM. Step E may take an "SNSUB" value and adjust the comparator value. Step E may compare comparator value against present levels and determines if error is present (e.g., too-low value, increments bin1; too-high value, increments bin2; or no-error value, increments bin0). The bins are incremented till one of the three rolls over to zero. At that time the buffered control word "DLTA" may be incremented, decremented, or remain unchanged according to load demands. All bins are then loaded with pre-set values to provide the best performance for the load condition.

In step E, there is a fast overvoltage test applied in the bin1 module to provide an incrementing limiting based on the device max voltage setting. This functions even if the main control parameter is set for current. Note that, although the control word is updated no further update will occur until the last has been loaded. This is controlled by "pass, 2" that is set on control word update and cleared in "LOADPW" module.

Step F "SHUTDOWN" controls the fault relief action. There may be two modes, one is recycling at 20 second intervals and the other is power-on-reset (POR). There are two configured for POR and that is for anti-arcing or zero-cross-detect failure and open circuit. Step E may receive fault release vector, shutdown recycles at a 20 second interval for over-current, over-voltage and under/over-line-voltage, and detect failure the reset is POR for under-current/no-load and anti-arcing/zero cross.

Step G "COM1" provides data removal through the UART. Internal data download may be configured to do a data dump, which is parsed on the receiving end for specific information. This can be configured for individual data points. The data dump is coordinated with the zero cross to avoid optical disturbance while the transfer is executed. Step G may create the data-dump stack and HELICOMM (HELICOMM is the manufacturer of the zigbee module and has a proprietary data stack, which has a header file for internal flow control) header for data transfer.

TABLE 5

| Byte # | |
|---|---|
| 0 | Helicomm data response header |
| 1 | Link quality from receiver |
| 2 | Device address lo (presently null) |
| 3 | Device address (presently null) |
| 4 | Outgoing payload length |
| 5 | Device type (1 = led) |
| 6 | Array current |
| 7 | Array voltage |
| 8 | Internal temperature near filter caps |
| 9 | Operating pulse width |
| 10 | XOR checksum value |

Step H "SAMPLET" creates two time delays, wherein one is about 8 usec for the a2d settling time and the other generates the 20 second delay for shutdown module. Step H may create time delay for a2d's ~8 microseconds (usec) and create time delay for shutdown ~20 seconds.

Step I "DATACHK" receives incoming data and confirms it is a command group for internal use or module use. Step I also decodes and executes commands. Step I may coordinate reception with normal operation to provide a seamless receive sequence, may check data usage for receiver control or internal device control, and may decode commands by numeric value of the command word.

TABLE 6

| Command # | Action |
|---|---|
| 1 | If value = 1 unit is off |
| 3 | If value = 3 unit is on |
| 5 | If value = 5 unit goes to max power |
| 7 | If value = 7 unit goes to min and ignores analog input |
| 9 | If value = 9 take next byte after command after as dim level |
| 11 | If value = 11 take next byte as ramp rate |
| ** | All commands are not presently installed |

Step J "LOADPW" combines the sine look-up table value (TMPCCP) with the double buffered control level value (dlta1) to develop the pulse with value and distribute them to the high and low byte of the control registers, lower two byte are located in the bits 4,5 of the ccp1con. The transfer is coordinated with PWM generator for glitch-less change of pulse width. Specifically, step J may create a pulse width value, distribute the value between HI and LO registers, and coordinate the pulse with change with a drive generator.

Step K "T1SET" loads the time slice generator with time interval of about 200 usec. Note that this timing is for 60 hertz, and the auto line frequency control may or may not be installed. The correct timing for 50 hertz may be 240 usec.

Step L "TABLE1" contains the line voltage phase-angle-coordinate offset values to provide a sinusoidal draw from the mains. These values may not represent a true sine look-up table. The values are adjusted from a real sine table to provide best line performance.

Programming codes for the pre-main loop provided below, combined with explanatory notes and the above descriptions, further enable one of ordinary skill in the art to implement various embodiments disclosed herein.

a. Related to FIG. 6

```
        CLRF    TEMP        ⎫  Temporary variables cleared for high speed shirt
        CLRF    AVGTMP1     ⎭  circuit test
        BCF     PASS,5
        BCF     PORTB,6     ; connect load. PortB, 6 is the control pin for the load
S2; high speed short circuit detect (FIG. 6)
BTFSS   PORTC,1             ; PortC,1 is a band-pass limited digital input across load current -sense resistors -
        GOTO    S1          R36, R35, and R19 ; If a current exceeds 20 the PortC,1 latch will set
        INCF    AVGTMP1,F   ; if set - the temp variable is incremented
        MOVLW   .20         ; A test is performed to see how many times the test has failed
        XORWF   AVGTMP1,W   has the test failed 20 times? Each test is about 3 usec
        BTFSS   STATUS,Z    Zero status bit is set if match of WREG and AVGTMP1
        GOTO    S2          ; If no match - repeat till match or portC,1 clears
        BSF     PORTB,6     ; DISCONNECT LOAD        ⎫  ; setting portB,6 disconnects load
        BCF     PASS1,0     ; TERMINATIING SHUTDOWN  ⎭  ; flags shutdown for POR mode
        GOTO    SHUTDOWN    ; FAULT RELEASE AND SHUTDOWN
S1; Re-entry point for none persistent short circuit
        CLRF    TEMP        ⎫  ; Reset temp variables for reuse
        CLRF    AVGTMP1     ⎭
        BSF     PORTC,2     ; BYPASS INRUSH LIMTER PortC, 2 controls inrush control switch to-
```

Bypass inrush limiting resistor

```
            MOVLW       .15
            MOVWF       TMPCCP          ; Preset variables to be used in first Pulse Width
determination
            MOVLW       .17
            MOVWF       DLTA1           ; DLT1 is buffered DLTA
            MOVWF       DLTA BCF         PASS,5                      ; Sets 2sec delay flag for UART
            CLRF        SHRTTM          ; timing word for short delay
            BCF         PASS1,2         ; PASS1, 2 AND PASS1,3 ARE 200 MSEC TIMING FLAGS
            BCF         PASS1,3         ; EACH ARE USED IN FUNCTIONS THAT MAY OR MAY-NOT
HAVE TIME                               ; HAVE TIME CONCOURENCE.
            MOVLW       .240
            MOVWF       TEMP            ; Temporary variable preloaded for compliment comparator
;CHECKLINE VOLTS
            ; VLINE INPUT CORRESPONDENCE APPROX 1.32V/CNT
            ; 107VAC    =       1.52    ; VOLTAGE AT CPU INPUT FOR CORROSPODING LINE VOLTS
            ; 119.5VAC  =       1.7
            ; 208VAC    =       3.0
            ; 240VAC    =       3.5
            ; 277VAC    =       4.0
            ; 305VAC    =       4.3
; IF INITIAL TEST FAILS THE LOOP WILL TRY 15 TIMES
S4; LINE VOLTAGE
            MOVLW       B'00000101'; LIFT justify, VDD=REF, ON
            MOVWF       ADCON0          ; AN1-On
            CALL        SAMPLET
S20
            BSF         ADCON0,GO       ; Start conversion          ; Capture line voltage
            BTFSC       ADCON0,GO       ; Is conversion done?
            GOTO        S20             ; No, test again
'MOVFW      ADRESH                      ; Read upper
            MOVWF       AVGTMP1
            MOVLW       .192            ; Compliment of this number is about 90 volts in
            ADDWF       AVGTMP1,W       ; 90 volts will shutdown
            BTFSC       STATUS,C        ; if below 90 carry will be clear
            GOTO        S21             ; if carry set voltage is not too low
            INCF        TEMP,F          ; Temp preloaded
            BTFSS       STATUS,Z        ; On each failed test temp is incremented until its zero
            GOTO        S4              ; Go back and test again
            GOTO        SHUTDOWN        ; After 16 tries got to cyclic shutdown
S21
            MOVLW       .30             ; Compliment to 305 to 310 line volts
            ADDWF       AVGTMP1,W       ; Is this above limit?
            BTFSS       STATUS,C        ; Carry set means over limit
```

```
            GOTO        S22                 ; if not over limit jump from test
            INCF        TEMP,F              ; on fail increment fail count
            BTFSS       STATUS,Z            ; zero means 16 tries executed
            GOTO        S4                  ; if not 16 tries loop back try again
            GOTO        SHUTDOWN            ; 16 tries failed got to cyclic shutdown
S22
; START DRIVE TIMER AND WAIT FOR FIRST CYCLE
            BCF         PIR1,TMR2IF         ; Clear TMR2 Flag for first cycle test
            BSF         T2CON,TMR2ON        ; Timer2 ON and starts to increment
S23
            BTFSS       PIR1,TMR2IF         ; Has TMR2 interrupt occurred?
            GOTO        S23                 ; NO loop back don't start drives till after one complete cycle
            BCF         PIR1,TMR2IF         ; reset timer flag
            MOVLW       .140                ; IF BELOW 208 START AT A HIGHER INITIAL PW to
            ADDWF       AVGTMP1,W           ; Do compliment test on line voltage capture
            BTFSC       STATUS,C            ; if clear line voltage below 208
            GOTO        S24                 ; line voltage is 208 or above? leave initial PW alone
            MOVLW .20                       ; If clear, move new value to PW register
MOVWF CCPR1L                                ; PW register
S24

; START DRIVE AND ENABLE INTERRUPTS
; MUST MAKE SURE ALL INTERRUPT FLAGS ARE RESET
; RECIEVER TURNED ON AFTER 2 SECOND DELAY -
; THIS PREVENTS COM FUNCTIONS DURING STABILZATION
; -FOUND IN ZCPT-
; CLEAR IOC ON PORT A2
            BCF         ECCPAS,ECCPASE      ; Internal drive control bit 0=off 1=on
            BSF         PASS,7              ; unit on/off flag
            BTFSS       PORTA,2             ; test zero cross input – need to read before
clear
            NOP                             ; allow 2 machine cycles
            BCF         INTCON,RABIF        ; clear zero cross flag IOC on portA2
            NOP
S25         ; WAIT FOR NEXT ZERO CROSS TO START
            BTFSS       INTCON,RABIF        ; keep testing for zero cross
            GOTO  S25                       ; no ZC – loop back till so
            BCF                  PIR1,RCIF  ; clear UART receive flag
            BCF                  INTCON,TMR1IF    ; clear timer1 flag
            CALL        T1SET               ; get timer1 set routine
            BSF                  T1CON,TMR1ON     ; Start time slice timer
            BSF                  INTCON,RABIE     ; allow IOC interrupt
LOOP1                   ; start of main control loop (1 LOOP TIME =28USEC)

BTFSS       PASS,7              ; PASS,7 is on/off status bit (page2 @58)
            GOTO        AUF                 ; if off jump around unused module
```

```
              MOVFW      CNT                       ; get current time slice value
(page2@59)
              BCF        INTCON,GIE                ; don't allow interrupts during table calls
              CALL       TABLE1                    ; get value corresponding to current count
(page2@63)
              BSF        INTCON,GIE                ; allow interrupts
              MOVWF      TMPCCP                    ; place table value into holding buffer
              CALL       DIMAV                     ; digital comparator and dimming adjustment
AUF                                                ; jump to point for unit off bypass
              CALL       SNSUB                     ; process sensor signal
              ; Capture of internal operating conditions begins here        (page 2 @66)
              BTFSC      PASS1,4                   ; set means that a capture has been done for 85 degree phase
angle
              GOTO       J32                       ; jump out if yes on 85 degree test
              MOVLW      .15                       ; XOR test for 85 degrees test
              XORWF      CNT,W                     ; 85 degrees?
              BTFSS      STATUS,Z    ; zero set if true
              GOTO       J32                       ; if not jump out of test
              BSF        PASS1,4                   ; if yes set 85 degree test flag – cleared at zero cross
              GOTO       J30                       ; jump to capture routines
J32
              BTFSC      PASS1,5                   ; set means that a capture has been done for 95 degree phase
angle
              GOTO       ZPT                       ; zero cross proximity test
              MOVLW      .21                       ; 95 degree count test
              XORWF      CNT,W                     ; XOR test for count
              BTFSS      STATUS,Z                  ; if true zero set
              GOTO       ZPT                       ; if not zero cross proximity test
              BSF        PASS1,5                   ; set means that a capture has been done for 95 degree phase
angle
J30           ; start of analog capture module (page 2@70)
              MOVLW B'10100101'    ; RIGHT justify
              MOVWF ADCON0         ; Vdd Vref, AN9, On
              CALL       SAMPLET   ; delay to allow channel to stabilize
              BSF        ADCON0,GO ; Start conversion
              BTFSC      ADCON0,GO ; Is conversion done?
              GOTO       $-1                       ; no, test again
              MOVFW      ADRESH                    ; read and transfer upper 2 bits        ; Typical capture routine
              MOVWF      VLEDHI1                   ; LED output voltage hi byte
              MOVFW      ADRESL                    ; read and capture lower 8 bits
              MOVWF      VLEDLO1   ; LED output voltage
              BCF        STATUS,C
              RRF        VLEDLO1,W
              MOVWF      LEDV
              BCF        STATUS,C
              RRF        LEDV,F
```

```
            BTFSC       VLEDHI1,0       ; make 8 bit value with two right shifts
            BSF         LEDV,6
            BTFSC       VLEDHI1,1
            BSF         LEDV,7
; OVERVOLTAGE TEST (OUTPUT)
            BTFSS       PASS1,3         ; flags 200 msec delay from start-up if set Ton>200msec
            GOTO        ICAP            ; if less than 200 msec form start don't do over voltage test
            MOVLW       .15             ; compliment value test
            ADDWF       LEDV,W          ; add compliment to captured value
            BTFSC       STATUS,C        ; if carry clear Vout <508
            GOTO        SHUTDOWN        ; over voltage got to shutdown ICAP                                    ; get array current on AN0
            MOVLW B'10000001'           ; RIGHT justify
            MOVWF ADCON0                ; Vdd Vref, AN0, On
            CALL        SAMPLET         ; stabilization delay
            BSF         ADCON0,GO       ; Start conversion
            BTFSC       ADCON0,GO       ; Is conversion done?
            GOTO        $-1             ; no, test again
            MOVFW       ADRESH          ; read and transfer upper 2 bits
            MOVWF       ILEDHI0         ; hi byte LED output current
            MOVFW       ADRESL          ; read and transfer lower 8 bits
            MOVWF       ILEDLO0         ; lo byte LED output current BCF         STATUS,C
            RRF         ILEDLO0,W
            MOVWF       ILED
            BCF         STATUS,C
            RRF         ILED,F                ; make 8 bit version for fast tests
            BTFSC       ILEDHI0,0
            BSF         ILED,6
            BTFSC       ILEDHI0,1
            BSF         ILED,7

; OVER CURRENT SHUTDOWN
            MOVLW       .3              ; highest value of high bit anything lower is good
            XORWF       ILEDHI0,W       ; is high byte =3?
            BTFSS       STATUS,Z        ; zero set if true
            GOTO        M1              ; go to under current test
            MOVLW       .40             ; over-current is about 850 ma
            ADDWF       ILEDLO0,W       ; do compliment test on low byte @ max high byte value
            BTFSS       STATUS,C        ; carry clear if not over
            GOTO        SCAP            ; if clear got to next test
            BSF         PASS1,0         ; non-cycling shutdown if PASS1,0 set
```

```
            GOTO       SHUTDOWN   ; on fail go to shutdown
M1; UNDER CURRENT SHUT DOWN
            BTFSS      PASS,7        ; don't do undercurrent test if OFF
            GOTO       SCAP          ; go to next capture
            BTFSS      PASS,5        ; pass,5 is a 2 second lockout on under-current test
            GOTO       SCAP          ; go to next test
            MOVFW      ILEDHI0       ; any high byte value negates test
            BTFSS      STATUS,Z      ; if high byte zero do low byte test
            GOTO       SCAP          ; if not zero go to next test
            MOVLW      .245          ; do compliment test
            ADDWF      ILEDLO0,W     ; if low byte <11 ~15 ma then shut down
            BTFSC      STATUS,C      ; carry set if >15
            GOTO SCAP                ; >15? go to next test
            MOVLW      .205          ; if current is low and there is a high pulse width something is
wrong
            ADDWF      DLTA,W        ; compliment test on present PW value
            BTFSS      STATUS,C      ; if PW >51 unit is in unknown high leakage condition
            GOTO       SCAP          ; low byte only current and highest PW something is wrong
shut-down
            BCF        PASS1,0       ; set for cycling shutdown
            GOTO       SHUTDOWN   ; go to shutdown
SCAP; CAPTURE FROM SENSOR INPUT (17)
            INCF       TGET,F        ; sensor inputs and temperature don't need speed
            BTFSC      STATUS,Z      ; TGET is incremented
            GOTO       CCAP          ; 255 loop passes is about 1 second
            MOVLW B'10011101 '       ; right justify, VDD=REF, ON
            MOVWF ADCON0             ; AN7-On
            CALL       SAMPLET       ; stabilization delay
            BSF ADCON0,GO            ; start conversion
            BTFSC      ADCON0,GO ; Is conversion done?              ; typical capture routine
            GOTO       $-1           ; No, test again
            MOVFW      ADRESH        ; Read upper 2 bits
            MOVWF SNSHI              ; sensor hi byte
            MOVFW      ADRESL        ; get lower 8 bits
            MOVWF      SNSLO         ; sensor lo byte
            GOTO       TCAP          ; go to next test
; a section of unused code was deleted making this jump mute
;------------------------------------------------------
; MCP9700 IS USED AS THE THERMAL SENSOR
; 0C=500MV - DELTA T/DELTA C=10MV/C - 25C-750MV & 100C=1.5V
; 125C=1.75 - 80C=1.3V
;------------------------------------------------------
TCAP; GET TEMPERATURE FROM SENSOR (4)
            MOVLW B'00101001'        ; LIFT justify, VDD=REF, ON
            MOVWF ADCON0             ; AN10-On
            CALL       SAMPLET       ; stabilization delay
```

```
        BSF      ADCON0,GO           ; Start conversion      ; non-typical 8 bit capture BTFSC    ADCON0,GO ; Is conversion done?
        GOTO     $-1                 ; No, test again
        MOVFW    ADRESH              ; Read upper 2 bits
        MOVWF AVGTMP1                ; store in temperature variable
        BCF      STATUS,C
        RRF      AVGTMP1,F ; TEMP VARIABLE
        BCF      STATUS,C
        RRF      AVGTMP1,F ; TEMP VARIABLE
        BCF      STATUS,C
        RRF      HEAT1,F                                     ; create a rolling average
        BCF      STATUS,C
        RRF      HEAT1,F   ; 1/4 VALUE OF LAMAVG
        MOVFW    HEAT1
        MOVWF    AVGTMP2   ; 2nd TEMP VARIABLE
        RLF      AVGTMP2,F ; 1/4 X 2 =2/4 2nd TEMP VARIABLE
        ADDWF    AVGTMP2,W ; ADD 1/4 OF OLD VALUE -
        MOVWF    HEAT1     ; FOR 3/4 2nd TEMP VARIABLE       ; rolling average continued
        MOVFW AVGTMP1      ; TEMP VARIABLE
        ADDWF    HEAT1,F                ; ADD 1/4 OF NE ; thermal roll down with over-temperature shutdown @110C----

MOVLW    .179                ; compliment test for above max 110 C
        ADDWF    HEAT1,W   ; above 110 C ?
        BTFSC    STATUS,C  ; if so carry set
        GOTO     SHUTDOWN  ; go to re-cycling shutdown
        MOVLW    .189                ; compliment test for above 80C
        ADDWF    HEAT1,W   ; 80 C ~ 1.3 V – count of 67
        BTFSC    STATUS,C  ; carry set if above
        GOTO     $+.5                ; jump ahead 5 lines if set
        BANKSEL HTCOMP
        CLRF     HTCOMP    ; heat comp is =0 below 80c
        PAGESEL CCAP
        GOTO     CCAP                ; done with heat
        MOVLW .67           ; create compensation word
        SUBWF    HEAT1,W   ; HTCOMP increases by amount above 80 C value
        BTFSS    STATUS,C  ; clear carry is not possible – don't use if so
        GOTO     CCAP
        MOVWF    HTCOMP    ; 1 CNT~2C
CCAP; LINE VOLTAGE
        MOVLW B'00000101'  ; LIFT justify, VDD=REF, ON
        MOVWF ADCON0       ; AN1-On
        CALL     SAMPLET   ; stabilization time
```

```
           BSF ADCON0,GO              ; Start conversion    ; 8bit capture of line voltage BTFSC     ADCON0,GO  ; Is conversion done?
           GOTO      $-1                    ; No, test again
           MOVFW     ADRESH             ; Read upper 8 bits
           MOVWF AVGTMP1          ; store in GPR space
           BCF       STATUS,C
           RRF       AVGTMP1,F  ; TEMP VARIABLE
           BCF       STATUS,C
           RRF       AVGTMP1,F  ; TEMP VARIABLE
           BCF       STATUS,C
           RRF       LINEV,F
           BCF       STATUS,C
           RRF       LINEV,F    ; 1/4 VALUE OF LAMAVG                ; rolling average
           MOVFW     LINEV
           MOVWF     AVGTMP2    ; 2nd TEMP VARIABLE
           RLF       AVGTMP2,W  ; 1/4 X 2 =2/4 2nd TEMP VARIABLE
           ADDWF     AVGTMP2,0  ; ADD 1/4 OF OLD VALUE -
           MOVWF     LINEV              ; FOR 3/4 2nd TEMP VARIABLE
           MOVFW AVGTMP1        ; TEMP VARIABLE
           ADDWF     LINEV,F    ; ADD 1/4 OF NE ; LOW/HIGH LINE VOLTAGE TURN OFF
           BTFSS     PASS,5                 ; bypass line voltage test for 2 sec after start
           GOTO   ZPT                       ; jump out if unit in operation < 2 sec
           MOVLW     .195                   ; compliment test for line voltage < 90
           ADDWF     LINEV,W                ; low line limit test
           BTFSC     STATUS,C   ; carry clear if too low
           GOTO      $+.2                   ; not low – check high
           GOTO      SHUTDOWN ; go to cycling shutdown
           MOVLW     .30                    ; compliment test for above 305
           ADDWF     LINEV,W                ; upper line limit
           BTFSS     STATUS,C   ; carry set if over-limit
           GOTO      ZPT                    ; go to zero-cross proximity test
           GOTO      SHUTDOWN ; go to cycling shutdown ZPT        ; ZERO CROSS PROXIMITY TEST (page 3@86)
           MOVLW     .33                    ; don't allow zero-cross until CNT >33
           XORWF     CNT,W                  ; check for 33
           BTFSS     STATUS,Z   ; if CNT >33 allow IOC on PORTA2
           GOTO   J25
; CLEAR PORTA FOR ZERO-CROSS TEST
           BTFSS     PORTA,2                ; must read before PORTA before the IOC-
           NOP                              ; can be cleared
           BCF       INTCON,RABIF           ; clear IOC flag
```

```
              nop
              BSF      INTCON,RABIE          ; enable IOC peripheral on PORTA,2
J25 ; TEST FOR PREMATURE ZERO-CROSS
              BTFSS    PASS,7                ; is unit on?
              GOTO     J26                   ; if not jump out
              MOVLW    .227                  ; stop this test before zero cross testing begins at-
              ADDWF    CNT,W                 ; a count of 33
              BTFSC    STATUS,C              ; compliment test for above 29
              GOTO     J26                   ; if above 29 skip out
              BTFSS    INTCON,RABIF          ; has a zero cross occurred at the wrong time
              GOTO     J26                   ; if no skip out
              BTFSS    PORTA,2               ; must read port before interrupt flag can be cleared
              NOP
              BCF      INTCON,RABIF          ; clear interrupt flag and
              INCF     FALTCNT,F             ; increment this file on each false zero cross
              BTFSS    STATUS,Z              ; if this variable rolls over to zero arcing is assumed
              GOTO     J26                   ; if not zero jump out
              BSF      PASS1,0               ; set for POR (Power On Reset)
              GOTO     SHUTDOWN              ; this is the anti-arcing
J26           ;
              MOVLW    .30                   ; If count is above 30 set safe third quad drive
              XORWF    CNT,W                 ; XOR test for 30 count
              BTFSC    STATUS,Z              ; zero set if true
              GOTO     $+.3                  ; if set jump ahead three lines
              PAGESEL  LOOP1
              GOTO     LOOP1                 ; start loop again
              BSF      PSTRCON,STRA          ; setting STRA and STRB of the-
              BSF      PSTRCON,STRB          ; pulse steering control puts the drives into safe mode
              GOTO     LOOP1                 ; This is module DIMAV. Creates the correct compare values
for the comparator with dimming requests ;
J22           ; GENERATE LOW VALUE COMPARE IF DIMMING IS UNDER -
              ; ANALOG CONTROL
              BTFSC    PASS,4                ; is dimming ANALOG=0 OR DIGITAL=1
              GOTO     J42                   ; jump here if digital control
MOVFW         SNSAVGLO ; get value from sensor capture
              BTFSC    CONFIGOP,0            ; CV=0 OR CI=1 CONFIGOP selects constant current or voltage
              GOTO     $+.3                  ; do compare for constant current
              SUBWF    CNTRLSVALOV,W         ; adjust set value by control word
              GOTO     $+.2                  ; this jump for constant voltage
              SUBWF    CNTRLSVALLOI,W
              MOVWF    CMPVALLO  ; create compare word
              BTFSC    STATUS,C  ; borrow set C=0?
              GOTO     J44                   ; if not jump
; IF BORROW  - CORRECT HI COMPARE VALUE
              MOVFW    SNSAVGHI  ; get hit byte sensor value
              SUBWF    CNTRLSVALHII,W        ; adjust hi byte set value
```

```
          BTFSS     STATUS,C    ;
          GOTO      J49
          BTFSC     CONFIGOP,0        ; CV OR CI?
          GOTO      $+.3              ; jump 3 lines for current
          DECF      CNTRLSVALHIV,W    ; borrow from hi byte voltage set value    ; CI or CV selector
          GOTO      $+.2              ; jump 2 to finish
          ;
          DECF      CNTRLSVALHII,W    ; borrow from hi byte current  set value
          MOVWF     CMPVALHI          ; set the comparator compare value
          GOTO      J42

J44       ; if borrow not required
          MOVFW     SNSAVGHI          ; correct hi byte set value with dimming capture
          BTFSC     CONFIGOP,0        ; CV OR CI
          GOTO      $+.3
          SUBWF     CNTRLSVALHIV,W    ; FOR CV      ; CI or CV selector
          GOTO      $+.2
          SUBWF     CNTRLSVALHII,W    ; FOR CI
          BTFSS     STATUS,C
          GOTO      J49               ; if borrow required dimming request value>min value
          MOVWF     CMPVALHI          ; make high compare value
          ADDWF     CMPVALLO,W        ; are both values =0?
          BTFSC     STATUS,Z
          GOTO      J49               ; J49 sets the compare words to preset value
          GOTO      J42
J49                                   ; set compare words to preset minimum MOVFW DIMVALHII             ; dimming value hi byte preset
          MOVWF     CMPVALHI          ; move this to comparator compare hi byte value
          MOVFW     DIMVALLOI         ; dimming value lo byte preset
          MOVWF     CMPVALLO          ; move this to comparator compare lo byte value
J42
          MOVLW     .247              ; if close to min value set to min preset value
          ADDWF     DIMLO,W           ; compliment test for close to min
          BTFSS     STATUS,C          ; if Dimlo is 8 bit version of input capture
          GOTO      $+.5                     ; if much greater than dim value jump out
          MOVFW DIMVALHII             ; dimming value hi byte preset
          MOVWF     CMPVALHI          ; move this to comparator compare hi byte value
          MOVFW     DIMVALLOI         ; dimming value lo byte preset
          MOVWF     CMPVALLO          ; move this to comparator compare lo byte value MOVFW     ILEDHI0                    ; get LED current
          BTFSS     CONFIGOP,0 ; CV OR CI? CONFIGOP,0 =1 FOR CI
          MOVFW VLEDHI1              ; LED VOLTAGE        ; make current or voltage choice

XORWF     CMPVALHI,W        ; I OR V HI = COMPARE HI?
```

```
        BTFSC     STATUS,Z              ; are hi bytes equal to request value?
        GOTO      J60                   ; if equal use low bytes MOVFW     CMPVALHI  ; if not equal to compare value than
        BTFSC     CONFIGOP,0 ; CV OR CI CONTROL⎤
        SUBWF     ILEDHI0,W  ; IF HI'S NOT EQUAL ⎬ ; make current or voltage choice
        BTFSS     CONFIGOP,0 ; CV OR CI CONTROL⎦
        SUBWF     VLEDHI1,W  ; C = 0 LED > CMPVAL C = 1 LED = CMPVAL
        BTFSC     STATUS,C   ; IF CARRY SET INCREASE OUTPUT
        GOTO      $+.2                  ; IF CARRY CLEAR DECREASE OUTPUT
        GOTO      BIN1                  ; INCREASE OUTPUT
        GOTO      BIN2                  ; DECREASE OUTPUT
J60     ; when hi bytes are equal focus will be on low bytes
        MOVFW     CMPVALLO
                  MOVFW     HYSTR
                  SUBWF     CMPVALLO,W      ; adjust compare word with hysteresis leave in W
                  BTFSC     STATUS,C        ; over-flow not allowed
                  GOTO      $+.5            ; carry set? Do compare – carry clear use .5X
HYSTR
                  MOVLW     .8              ; half of HYSTR value if overflow occurs
                  SUBWF     CMPVALLO,W      ; adjust compare word with.5X hysteresis leave
in W
                  BTFSS     STATUS,C        ; carry set =no overflow
                  MOVFW     CMPVALLO        ; if carry clear don't use hysteresis
        BTFSS     CONFIGOP,0   ⎤
        GOTO      $+.3         ⎬           ; constant I or V selector
        SUBWF     ILEDLO0,W    ⎮
        GOTO      $+.2         ⎦
        SUBWF     VLEDLO1,W               ; C=0 CMPVALLOW >F    C=1 CMPVALLOW<F
        BTFSS     STATUS,C                ; carry clear means actual < desired value GOTO      BIN1                    ; increment bin
                  MOVFW     HYSTR         ; adjust compare word with hysteresis leave in
W
                  ADDWF     CMPVALLO,W    ; under-flow not allowed
                  BTFSS     STATUS,C    ; carry clear? Do compare – carry set use .5X HYSTR
                  GOTO      $+.5          ; half of HYSTR value if underflow occurs
                  MOVLW     .8            ; adjust compare word with.5X hysteresis leave
in W
                  ADDWF     CMPVALLO,W    ; carry clear =no overflow
                  BTFSC     STATUS,C    ; if carry clear don't use hysteresis
                  MOVFW     CMPVALLO ;

BTFSS     CONFIGOP,0   ⎤
        GOTO      $+.3         ⎬           ; constant I or V selector
        SUBWF     ILEDLO0,W    ⎦
```

```
            GOTO      $+.2
            SUBWF     VLEDLO1,W           ; C=0 W>F    C=1 CMPVALLO<F
            BTFSS     STATUS,C            ; carry set  means actual > desired value
            GOTO      BIN0                ; carry clear means actual is in hysteresis value of desired
            GOTO      BIN2

; CONTROL BINS
BIN2; REDUCE PULSE WIDTH-PASSING TO HERE MEANS VALUE IS TOO HIGH
            INCF      BINHI,F             ; the too high accumulator
            BTFSS     STATUS,Z            ; incremented to zero?
            RETURN                        ; if not comparator module is done
            MOVFW     CNTLO
            MOVWF     BINLO
            MOVFW     CNTSET              ; accumulator bins set to preset values
            MOVWF     BINCNTR
            MOVFW     CNTHI
            MOVWF     BINHI BTFSC     PASS,2              ; PASS,2 flags comparator that the last update has been used
            RETURN                        ; do nothing until last update is acted upon
            MOVLW     .238                ; If OK to update check to see if at minimum
            ADDWF     DLTA,W              ; do compliment test
            BTFSS     STATUS,C            ; LOW LIMIT TEST carry set for above minimum
            GOTO      $+.4                ; if carry clear don't decrement
            MOVFW     DLTA
            BTFSS     STATUS,Z            ; IF DLTA ZERO DON'T DEC
            DECF      DLTA,F              ; IF NOT ZERO UPDATE PW
            BSF       PASS,2              ; SET DATA READY FLAG
            BCF       PASS,0              ; set value locked-in flag
            RETURN BIN0 ; this is the bin for nominal value acquire
            BTFSC     PASS,2                          ; CHECK IF LAST DATA UPDATE OCCURED
            RETURN                                    ; IF NOT DONT UPDATE UNTIL SO
            INCF      BINCNTR,F
            BTFSS     STATUS,Z            ; if Z=1 then rolled over (BINCNTR full)
            RETURN                                    ; Z not equal to 0 go back to "beginning"
            MOVFW     CNTLO
            MOVWF     BINLO
            MOVFW     CNTSET              ; accumulator bins set to preset values
            MOVWF     BINCNTR
            MOVFW     CNTHI
            MOVWF     BINHI
            BSF       PASS,0                          ; SET-VALUE-ACQUIRED FLAG
            BSF       PASS,2                          ; SET DATA READY FLAGE
            RETURN
```

```
BIN1; INCREASE PW
        MOVLW    .25                ; high speed over voltage test on each loop pass
        ADDWF    LEDV,W             ; do compliment test for voltage
        BTFSC    STATUS,C           ;
        GOTO     BIN2               ; increases the too-high bin count
        INCF     BINLO,F            ; add to BINLO accumulator
        BTFSS    STATUS,Z           ; if Z=1 then BIN1 rolled over (BINLO full)
        RETURN                      ; Z was not set so go back to "beginning"
        MOVFW    CNTLO
        MOVWF    BINLO
        MOVFW    CNTSET             ; accumulator bins set to preset values
        MOVWF    BINCNTR
        MOVWF    BINHI
        BTFSC    PASS,2             ; CHECK IF LAST DATA UPDATE OCCURED
        RETURN                      ; IF NOT DONT UPDATE UNTIL SO
        INCF     DLTA,F             ; should not increment to zero
        BTFSS    STATUS,Z           ; check if zero
        GOTO     $+.3               ; do not allow over inc or zero
        ;
        MOVLW    .170               ; reset PW value to a known condition
        MOVWF    DLTA
        BSF      PASS,2             ; DATA UPDATE OCCURED FLAG
        BCF      PASS,0             ; set value is not acquired
        RETURN ZCPT    ; called from ISR (Interrupt Service Routine) at occurrence of zero cross of line voltage
        BTFSS    PASS,7             ; PASS,7 is unit ON/OFF flag
        GOTO     Z15                ; set for off condition drive preset to safe mode
        MOVLW    .250               ; compliment of count value for bad ZCS
        ADDWF    CNT,W              ; zero cross too early  time slice only 6!
        BTFSC    STATUS,C           ; carry clear means ZCS timing OK
        GOTO     Z15                ; carry set means ZCS too early CLRF     CNT                ; RESET SINE WAVE TIME SLICE COUNT
        INCF     CNT,F              ; increment time slice for first value this half cycle
        INCF     TMPCNT,F           ; increment data transfer count
        BTFSS    STATUS,Z           ; if zero allow new PW value to transfer
        GOTO     Z4                 ; begin third quad control
        MOVFW    CNTCTRL
        MOVWF    TMPCNT
        MOVFW    DLTA               ; TRANSFER OFSET ONLY ON WHOLE HALF CYCLES
        MOVWF    DLTA1              ; DLTA1 is buffer for DLTA
        BCF      PASS,2             ; PASS FORWARD THAT DATA CAN TRANSFER
        GOTO     Z4                 ; begin third quad control
Z15
```

```
            BSF PSTRCON,STRA       ; RC5  setting STRA and STRB places drive in safe mode
            BSF PSTRCON,STRB       ; RC4
            BCF       PASS,6       ; keep PASS,6 correlated with cycle half
            BTFSS     PORTA,2      ; if PORTA,2 is set – PASS,6 is clear
            BSF       PASS,6       ; if PORTA,2 is clear
            GOTO      Z2           ; end third quad control Z4 ; THIRD QUAD CONTROL
            BTFSS     ECCPAS,ECCPASE   ; IF OFF MAKE SURE THAT-
            GOTO      Z3           ; if ON go to third quad drive setup
            BSF       PORTC,5      ; PORT 4 AND 5 ARE-
            BSF       PORTC,4      ; SET TO AVOID SHOOT-THRU-
            GOTO      Z2           ; IN THE BOOST STAGE!
Z3 ; DRIVE FOR P1B
            BTFSS     PORTA,2      ; if PORTA,2 set this is positive half of cycle
            GOTO      Z1           ; if clear this is negative half go to third quad negative control BTFSS     PORTA,2      ; check  PORTA,2 again
            GOTO      Z1           ; if clear this is negative half go to third quad negative control BTFSC     PASS,6       ; PASS,6 internal tracking to cross correlate zero cross signal
            GOTO      Z15          ; POTA,2 should be high and PASS,6 low
            BCF       PSTRCON,STRA ; RC5 has no drive A out signal - port is set or cleared by port
latch
            BSF       PSTRCON,STRB ; RC4 has pulse with drive signal
            NOP                    ; allows 2 machine cycle delay for port latency
            BCF       PORTC,5      ; clears port latch and sets drive high
            BSF       PORTC,4      ; Port C4 is under PW control – best if set to avoid drive
ambiguity
            BSF       PASS,6       ; toggle PASS,6 to anticipate what next toggle should be
            BTFSC     PORTA,2      ; IF 1/2 CYCLE PHASING IS INCORRECT-
            GOTO      Z2           ; jump out out third quad control
            BTFSC     PASS,7       ; on/off flag skip next if ON
            GOTO      Z11          ; must be OFF assure drive in safe mode
            GOTO      Z2           ; jump out out third quad control
Z1; same as Z3 except for positive half line cycle drive A and Drive B reversed
```

```
            BTFSC       PORTA,2             ; DOUBLE CHECK ON PORTA
            GOTO        Z3                  ; PREVENT SHOOTHRU ON FALSE READ
            BTFSC       PORTA,2             ; DOUBLE CHECK ON PORTA
            GOTO        Z3                  ; PREVENT SHOOTHRU ON FALSE READ
            NOP
            NOP
            BTFSS       PASS,6              ; PASS 6 IS TOGGLED AND COMPARED-
            GOTO        Z15                 ; TO PORTA CONDITION - IF WRONG EXIT
            BCF         PSTRCON,STRB        ; P1B RC4
            BSF         PSTRCON,STRA        ; P1A RC5
            ; see z3
            NOP
            BCF         PORTC,4    ; P1B
            BSF         PORTC,5

BCF         PASS,6
            BTFSS       PORTA,2             ; DOUBLE CHECK ON PORTA
            GOTO        Z2
            BTFSC       PASS,7
            GOTO        Z11
            GOTO        Z2
Z11         ; set safe mode
            BSF         PORTC,5             ; PORT 4 AND 5 latches are set
            BSF         PORTC,4                     ; to pull output stage low on PW generator
failure
            BSF         PSTRCON,STRB                ; P1B- RC4 if drive ambiguity is possible-
            BSF         PSTRCON,STRA                ; P1A -RC5 put same drive on both ports Z2 ; End third quad control
            BTFSC       PASS1,2             ; this generates delay signals based on-
            GOTO        J28                 ; a 9.3 msec half -line cycle -  if not set
            INCF        SHRTTM,F            ; SHRTTM is the number of half cycles
            MOVLW       .50                 ; about 465 msec
            XORWF       SHRTTM,W            ; are we there yet?
            BTFSS       STATUS,Z            ; zero flag set if so
            GOTO        $+.4                ; if Z is clear skip out
            CLRF        SHRTTM              ; reset half cycle word
            BSF         PASS1,2             ; set time up flag
            BSF         PASS1,3             ; set time up flag J28; counts time in ½ line cycles
            INCF        TICK_LO,F           ; each overflow is 2.125 seconds
            BTFSS       STATUS,Z
            GOTO        J20                 ; on first overflow the lockout on the UART is released
            BTFSC       PASS,5              ; PASS 5 IS RCVR ENABLE FLAG
            GOTO        J21
```

```
            BCF        PIR1,RCIF     ; START WITH NO RCV FLAG
            BSF        RCSTA,CREN    ; ENABLES CONTINUOUS RCV
            BSF        RCSTA,SPEN    ; ENABLE RECIEV
            BSF        PIE1,RCIE
            BSF        PASS,5        ; when set - lockout code is released till next start cycle J21
            INCF       TICK_HI,F                    ; 9 hour @ overflow
            BTFSS      STATUS,Z
            GOTO       J20
                       INCF      TICK_VHI,F        ; 2320 hour @ overflow
                       BTFSS     STATUS,Z
                       GOTO      J20
                                 INCF       TICK_UHI,F    ; 594.1K hour @ overflow
                                 BTFSS      STATUS,Z J20
            BCF        PORTA,2       ; must read or write port to clear IOC flag
            BCF        INTCON,RABIF  ; clear interrupt flag
            BCF        INTCON,RABIE  ; Disable IOC on PORTA,2 – re-enabled in ZPT module
            RETURN INCF       PASSCNT3      ; temp variable from startup
            MOVLW      .4            ; test for 4$^{th}$ pass
            XORWF      PASSCNT3,W    ; pass 4?
            BTFSC      STATUS,Z      ; Z set if 4th
            GOTO       SN7           ; if not 4$^{th}$ accumulate pre-average value
            MOVFW      SNSLO         ; get lo byte of sensor input
            ADDWF      SNBUFLO,F     ; add to lo byte of averaging buffer
            BTFSS      STATUS,C      ; if carry set skip forward two lines
            GOTO       $+.2
            INCF       SNBUFHI,F     ; increment from carry set
            MOVFW      SNBUFHI       ; no carry comes here
            ADDWF      SNSHI,W       ; add hi bytes of sensor averaging word
            MOVWF      SNBUFHI       ; averaging word ; Correct dimming for line voltage – tends to drift up slightly with increasing voltage
            MOVFW      LINEV         ; get measured line voltage
            MOVWF      TEMP
            BCF                STATUS,C
            RRF                TEMP,F        ;/2
            BCF                STATUS,C
            RRF                TEMP,F        ;/4
            BCF                STATUS,C
```

|       |        |            |                           |
|-------|--------|------------|---------------------------|
|       | RRF    | TEMP,F     | ;/8                       |
|       | BCF    | STATUS,C   |                           |
|       | RRF    | TEMP,W     | ;/16                      |
|       | ADDWF  | SNBUFLO,F  | ; add to averaging buffer word |
|       | BTFSS  | STATUS,C   | ; carry set?              |
|       | RETURN |            | ; if not done             |
|       | MOVLW  | .1         | ; carry added to hi sensor averaging word |
|       | ADDWF  | SNBUFHI,F  |                           |
|       | RETURN |            |                           |

;

SN7    ; GET DIMING LEVEL - AVG OF 3 NEW 1 OLD VALUE

|       |        |             |                                |
|-------|--------|-------------|--------------------------------|
|       | CLRF   | PASSCNT3    | ; reset 4th pass test word   |
|       | BCF    | STATUS,C    |                                |
|       | RRF    | SNBUFLO,F   | ;/2                            |
|       | BCF    | STATUS,C    |                                |
|       | RRF    | SNBUFLO,F   | ;/4                            |
|       | BCF    | STATUS,C    |                                |
|       | RRF    | SNBUFHI,F   |                                |
|       | BTFSC  | STATUS,C    |                                |
|       | BSF    | SNBUFLO,6   |                                |
|       | BCF    | STATUS,C    |   ; hi and lo averaging        |
|       | RRF    | SNBUFHI,F   |                                |
|       | BTFSC  | STATUS,C    |                                |
|       | BSF    | SNBUFLO,7   | ; SNBUFHI & LO                 |
|       | BCF    | STATUS,C    |                                |
|       | RRF    | SNBUFLO,W   | ;/2                            |

| MOVWF | SNS    |             |                                     |
|-------|--------|-------------|-------------------------------------|
|       | BCF    | STATUS,C    |                                     |
|       | RRF    | SNS,F       | ;/4                                 |
|       | BSF    | SNS,6       |                                     |
|       | BTFSS  | SNBUFHI,0   |                                     |
|       | BCF    | SNS,6       |                                     |
|       | BSF    | SNS,7       | ; make 8 bit version of dimming capture |
|       | BTFSS  | SNBUFHI,1   |                                     |
|       | BCF    | SNS,7       |                                     |
|       | MOVFW  | SNS         |                                     |
|       | BTFSC  | STATUS,Z    |                                     |
|       | GOTO   | $+.2        |                                     |
|       | MOVWF  | DIMLO       | ; 8 BIT CONTROL WORD                |

|       | MOVFW  | SNBUFHI     |                                                        |
|-------|--------|-------------|--------------------------------------------------------|
|       | MOVWF  | SNSAVGHI    |                                                        |
|       | MOVFW  | SNBUFLO     | ; requires buffering to avoid partial updates during interrupts |
|       | MOVWF  | SNSAVGLO    |                                                        |

; set value > 500MA? - breaks the control level into ranges to improve control resolution

```
            MOVFW   SNBUFLO              ; buffer lo byte of sensor capture
            MOVWF   TEMP                 ; buffer word MOVLW   .0                   ; is hi byte zero?
            XORWF   CNTRLSVALHII,W       ; test for zero
            BTFSC   STATUS,Z             ; skip if not zero
            GOTO    SN9                  ; go to lo range dim control MOVLW   .1                   ; is hi byte 1. ?
            XORWF   CNTRLSVALHII,W       ; test for 1
            BTFSC   STATUS,Z             ; skip if not 1
            GOTO    SN8                  ; go to hi range dim control ;           MOVLW   .2                   ; code not used was for mid range control
;           XORWF   CNTRLSVALHII,W
;           BTFSC   STATUS,Z
            GOTO    SN20
```

SN9 ; Divide the control word by two before adjusting control set word

```
            BCF     STATUS,C
            RRF     TEMP,F           ;/2lo

BCF     STATUS,C
            RRF     SNBUFHI,W  ;/2hi             ; make hi and lo /2 control word followed by /2
            BTFSC   STATUS,C
            BSF     TEMP,7
            MOVWF   TEMP1
SN8
            BCF     STATUS,C
            RRF     TEMP,F           ;/4lo BCF     STATUS,C
            RRF     SNBUFHI,W  ;/4hi             ; make hi and lo /2 control word followed by /2
            BTFSC   STATUS,C
            BSF             TEMP,7
            MOVWF   TEMP1

CALL    CMPNUM           ; routine simply makes an 8 bit version of either /2 or /4 version
                                     ; and divides the set value by eight and places it in temp2

MOVFW   TEMP2            ; adjust the dimming value by 1/8 of the set value
            SUBWF   TEMP,F           ; reduce control word by 1/8 of the set value
            BTFSC   STATUS,C  ; carry required?
```

```
            GOTO      SN24              ; no? skip out
            MOVFW     TEMP1             ; check for high bit zero
            BTFSC     STATUS,Z          ; no? skip next instruction
            GOTO      $+.3              ; yes! Skip ahead 3 instructions
            DECF      TEMP1,F           ; reduce hi byte by carry
            GOTO      SN24
            MOVFW     TEMP2             ; re-construct original value as reduce is below zero
            ADDWF     TEMP              ; add with original compensation not possible
            GOTO      SN24

SN20        ; above 500 ma compensation
            MOVFW     SNBUFLO
            MOVWF     TEMP
            MOVFW     SNBUFHI                                 ; buffer dimming capture word
            MOVWF     TEMP1

CALL      CMPNUM            ; routine simply makes an 8 bit version of either /2 or /4 version
                                        ; and divides the set value by eight and places it in temp2

MOVFW     TEMP2
            SUBWF     TEMP,F
            BTFSC     STATUS,C
            GOTO      SN24
            MOVFW     TEMP1
            BTFSC     STATUS,Z
            GOTO      SN29
            DECF      TEMP1,F
            GOTO      SN24
SN29
            MOVFW     TEMP2
            ADDWF     TEMP,F
SN24
            MOVFW     TEMP
            MOVWF     SNSAVGLO
            MOVFW     TEMP1
            MOVWF     SNSAVGHI
SN21
; THIS IS FOR THERMAL ROLL DOWN
            MOVFW     HTCOMP            ; check if a reduction in output is requested by temperature
            BTFSC     STATUS,Z          ; zero means no
            RETURN                      ; module is done MOVFW     SNSAVGHI          ; if not zero power needs adjusted to reduce temperature
            BTFSC     STATUS,Z          ; if dimming is already fully deployed don't adjust further
            RETURN                      ; module is done
```

```
            SUBWF       SNSAVGLO,F ; if hi byte not zero then reduce output
            BTFSC       STATUS,C    ; carry required?
            RETURN                              ; if not module done
            DECF        SNSAVGHI    ; if so reduce by carry
            RETURN                              ; module is done Shutdown ; orderly cessation of operation
            BCF         INTCON,GIE          ;DISABLE INTERRRUPTS
            BSF         ECCPAS,ECCPASE
            BSF         PORTC,4                         ; IMPORTANT FOR NO GLITCH-
            BSF         PORTC,5                         ; AT OR NEAR ZERO-CROSS
            BSF         PORTB,6                         ; DISCONNECT
            BCF         PASS,7                          ; UNIT ON/OFF FLAG SET TO OFF
            BSF         PSTRCON,STRA                    ; SET THIRD QUAD SAFE MODE
            BSF         PSTRCON,STRB                    ; BOTHDRIVES OUTPUT THE SAME CALL        LDELAY              ; RECYLING SHUTDOWN DELAY about 20 seconds
            BTFSC       PASS1,0             ; FLAGS NON-CYCLING SHUTDOWN =1
            GOTO        $+.4                ; non-cycling allows only POR restart
            BCF         PASS1,0             ; clears the non-recycling for future wake from sleep
functions
            BCF         PASS,5              ; resets the 2 second lockout on the UART
            GOTO        FIRST               ; restart vector CLRF        INTCON              ; assure no wake from sleep
            CLRF        PIE1                ; assure no peripherals are allowed to wake from sleep
            SLEEP                           ; Done till power is re-cycled
            NOP                             ; the last two lines are safety during coding
            GOTO        FIRST               ; allows orderly restart if
            RETURN
```

In the present disclosure, a single phase bridgeless boost converter may refer to and encompass any of the structures discussed in the publications referred to, incorporating novel features disclosed herein. There is a need for a bridgeless boost converter particularly adapted to the needs of LED lighting drives. Such a converter may obtain high efficiency by using continuous mode conduction disclosed herein and turning on the FETs during operation under reverse biasing. Such a converter may have computationally efficient algorithms which can run the power factor correction and output voltage regulation process using minimal computing resources.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A circuit serving as a power source for light-emitting diode (LED) lighting applications, the circuit comprising:
   a boost converter comprising a pair of boost field-effect transistors (FETs) and a boost inductor coupled to the pair of boost FETs, wherein an input voltage feeding the boost converter has a sinusoidal waveform, and wherein a half cycle of the input voltage is represented by a plurality of time slices; and
   a controller coupled to the boost converter and configured to:
      determine a current time slice in the plurality of time slices;
      generate one or more output signals based at least in part on the current time slice and without a need to compute any multiplier function involving the input voltage; and
      control states of the boost FETs using the one or more output signals.

2. The circuit of claim 1, further comprising a circuit section coupled to the controller and configured to identify a zero-cross point of the input voltage in the half cycle, wherein the plurality of time slices immediately trails the zero-cross point, and wherein determining the current time slice occurs after the identification of the zero-cross point.

3. The circuit of claim 2, wherein the controller comprises a lookup table configured to store a plurality of pulse width (PW) values each corresponding to one of the plurality of time slices, and wherein the one or more output signals comprise a pulse width modulation (PWM) signal generated by the controller based on a PW value corresponding to the current time slice.

4. The circuit of claim 3, wherein the controller is a microcontroller equipped with pins that provide the one or more output signals to the boost controller.

5. The circuit of claim 3, wherein generating the PWM signal is further based on an output voltage of the boost converter.

6. The circuit of claim 5, wherein the controller is further configured to:
   measure the output voltage of the boost converter;
   correct the PW value by performing the following steps:
      adding an offset value to the PW value when the output voltage is substantially lower than a target value;
      subtracting an offset value from the PW value when the output voltage is substantially higher than the target value; and
      maintaining the PW value when the output voltage substantially equals the target value; and
   place the corrected PW value in a drive generator in the controller to generate the PWM signal.

7. The circuit of claim 5, wherein the controller is further configured to:
   detect that the output voltage of the boost converter has fallen below a threshold value; and upon detection of the output voltage, control the boost FETs such that one of the boost FETs switches on to charge the boost inductor regardless of any existing current flowing through the boost inductor.

8. The circuit of claim 1, wherein the states of the boost FETs are controlled by the controller such that one of the boost FETs operates in a third quadrant while the other one of the boost FETs is forward biased.

9. The circuit of claim 8, wherein a voltage between the drain and the source of the boost FET operating in the third quadrant is less than a turn-on threshold voltage of a parasitic body diode in the boost FET.

10. The circuit of claim 1, wherein the boost converter further comprises a third FET and a fourth FET each coupled in series to one of the pair of boost FETs, wherein the boost converter lacks a stand-alone boost diode, and wherein the controller is further configured to drive the third FET and the fourth FET.

11. A power source circuit comprising:
   a boost converter comprising a pair of boost field-effect transistors (FETs) and a boost inductor coupled to the pair of boost FETs; and
   a controller coupled to the boost converter and configured to control states of the boost FETs such that one of the boost FETs operates in a third quadrant while the other one of the boost FETs is forward biased, wherein a voltage between the drain and the source of a boost FET operating in the third quadrant is less than a turn-on threshold voltage of a parasitic body diode in the boost FET.

12. The power source circuit of claim 11, wherein an input voltage feeding the boost converter has a sinusoidal waveform, wherein the controller is further configured to:
   identify a zero-cross point of the input voltage as a start of a half cycle represented by a plurality of time slices;
   determine a current time slice in the plurality of time slices;
   generate one or more output signals based at least in part on the current time slice and without computing any multiplier function involving the input voltage; and
   control states of the boost FETs using the one or more output signals.

13. The power source circuit of claim 11, wherein the controller comprises a lookup table configured to store a plurality of pulse width (PW) values each corresponding to one of the plurality of time slices, wherein the one or more signals comprise a pulse width modulation (PWM) signal, and wherein the controller is further configured to:
   measure an output voltage of the boost converter;
   correct a PW value corresponding to the current time slice by performing the following steps:
      adding an offset value to the PW value when the output voltage is substantially lower than a target value;
      subtracting an offset value from the PW value when the output voltage is substantially higher than the target value; and
      maintaining the PW value when the output voltage substantially equals the target value; and
   place the corrected PW value in a drive generator in the controller to generate the PWM signal.

14. The power source circuit of claim 11, wherein the boost converter further comprises a third FET and a fourth FET each coupled in series to one of the pair of boost FETs, wherein the boost converter lacks a stand-alone boost diode, and wherein the controller is further configured to drive the third FET and the fourth FET.

15. In a power source that comprises a boost converter and a controller coupled to the boost converter, a method comprising:
   feeding the boost converter with an input voltage with a sinusoidal waveform, wherein a half cycle of the input voltage is represented by a plurality of time slices;
   determining, by using the controller, a current time slice in the plurality of time slices; and
   generating, by using the controller, one or more signals to control the boost converter, wherein generating the one or more signals is based in part on the current time slice and involves no computation of any multiplier function operating on the input voltage.

16. The method of claim 15, further comprising identifying a zero-cross point of the input voltage in the half cycle, wherein the plurality of time slices immediately trails the zero-cross point, and wherein determining the current time slice occurs after the identification of the zero-cross point.

17. The method of claim 16, wherein the controller comprises a lookup table configured to store a plurality of pulse width (PW) values each corresponding to one of the plurality of time slices, wherein the one or more signals comprise a pulse width modulation (PWM) signal, and wherein generating the PWM signal is further based on a PW value corresponding to the current time slice and an output voltage of the boost converter.

18. The method of claim 17, further comprising:
   measure the output voltage of the boost converter;
   correcting the PW value by performing the following steps:
      adding an offset value to the PW value when the output voltage is substantially lower than a target value;
      subtracting an offset value from the PW value when the output voltage is substantially higher than the target value; and
      maintaining the PW value when the output voltage substantially equals the target value; and
   placing the corrected PW value in a drive generator in the controller to generate the PWM signal.

19. The method of claim 15, wherein the boost converter comprises a pair of boost field-effect transistors (FETs) and a boost inductor coupled to the pair of boost FETs, wherein the method further comprises detecting that the output voltage of the boost converter has fallen below a threshold value, and wherein, upon detection of the output voltage, the boost converter is controlled such that one of the boost FETs switches on to charge the boost inductor regardless of any existing current flowing through the boost inductor.

20. The method of claim 19, wherein the states of the boost FETs are controlled by the controller such that one of the boost FETs operates in a third quadrant while the other one of the boost FETs is forward biased, and wherein a voltage between the drain and the source of the boost FET operating in the third quadrant is less than a turn-on threshold voltage of a parasitic body diode in the boost FET.

* * * * *